US011262286B2

(12) United States Patent
Ozcan et al.

(10) Patent No.: US 11,262,286 B2
(45) Date of Patent: Mar. 1, 2022

(54) LABEL-FREE BIO-AEROSOL SENSING USING MOBILE MICROSCOPY AND DEEP LEARNING

(71) Applicant: THE REGENTS OF THE UNIVERSITY OF CALIFORNIA, Oakland, CA (US)

(72) Inventors: Aydogan Ozcan, Los Angeles, CA (US); Yichen Wu, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 106 days.

(21) Appl. No.: 16/858,444

(22) Filed: Apr. 24, 2020

(65) Prior Publication Data

US 2020/0340901 A1 Oct. 29, 2020

Related U.S. Application Data

(60) Provisional application No. 62/838,149, filed on Apr. 24, 2019.

(51) Int. Cl.
*G01N 15/02* (2006.01)
*G03H 1/22* (2006.01)
(Continued)

(52) U.S. Cl.
CPC ....... *G01N 15/0227* (2013.01); *G03H 1/0443* (2013.01); *G03H 1/2294* (2013.01);
(Continued)

(58) Field of Classification Search
CPC ....... G01N 15/0227; G01N 2015/0233; G01N 2015/1493; G01N 2015/1497;
(Continued)

(56) References Cited

U.S. PATENT DOCUMENTS

2012/0148141 A1 6/2012 Ozcan et al.
2012/0157160 A1 6/2012 Ozcan et al.
(Continued)

FOREIGN PATENT DOCUMENTS

WO WO 2019/103909 5/2019
WO WO 2019/191697 10/2019
(Continued)

OTHER PUBLICATIONS

B Schneider, Fast particle characterization using digital holography and neural networks, 2016, vol. 55, Issue 1, pp. 133-139 (Year: 2016).*

(Continued)

*Primary Examiner* — Michael P LaPage
(74) *Attorney, Agent, or Firm* — Vista IP Law Group LLP

(57) ABSTRACT

A label-free bio-aerosol sensing platform and method uses a field-portable and cost-effective device based on holographic microscopy and deep-learning, which screens bio-aerosols at a high throughput level. Two different deep neural networks are utilized to rapidly reconstruct the amplitude and phase images of the captured bio-aerosols, and to output particle information for each bio-aerosol that is imaged. This includes, a classification of the type or species of the particle, particle size, particle shape, particle thickness, or spatial feature(s) of the particle. The platform was validated using the label-free sensing of common bio-aerosol types, e.g., Bermuda grass pollen, oak tree pollen, ragweed pollen, *Aspergillus* spore, and *Alternaria* spore and achieved >94% classification accuracy. The label-free bio-aerosol platform, with its mobility and cost-effectiveness, will find several applications in indoor and outdoor air quality monitoring.

15 Claims, 20 Drawing Sheets

(51) Int. Cl.
*G03H 1/04* (2006.01)
*G06T 7/00* (2017.01)
*G06N 3/04* (2006.01)
*G06T 7/62* (2017.01)

(52) U.S. Cl.
CPC ......... *G06N 3/0454* (2013.01); *G06T 7/0012* (2013.01); *G06T 7/62* (2017.01); *G01N 2015/0233* (2013.01); *G03H 2001/0447* (2013.01); *G06T 2207/10056* (2013.01); *G06T 2207/20084* (2013.01)

(58) Field of Classification Search
CPC ....... G01N 2015/0038; G01N 15/1475; G03H 1/2294; G03H 1/0443; G03H 2001/0447; G03H 2001/266; G03H 1/2645; G06T 7/0012; G06T 2207/10056; G06T 2207/20084; G06T 2207/20081; G06T 7/62; G06N 3/0454; G06N 3/084
See application file for complete search history.

(56) References Cited

U.S. PATENT DOCUMENTS

| | | | |
|---|---|---|---|
| 2012/0218379 A1 | 8/2012 | Ozcan et al. | |
| 2012/0248292 A1 | 10/2012 | Ozcan et al. | |
| 2012/0281899 A1 | 11/2012 | Ozcan et al. | |
| 2013/0092821 A1 | 4/2013 | Ozcan et al. | |
| 2013/0157351 A1 | 6/2013 | Ozcan et al. | |
| 2013/0193544 A1 | 8/2013 | Ozcan et al. | |
| 2013/0203043 A1 | 8/2013 | Ozcan et al. | |
| 2013/0258091 A1 | 10/2013 | Ozcan et al. | |
| 2013/0280752 A1 | 10/2013 | Ozcan et al. | |
| 2014/0120563 A1 | 5/2014 | Ozcan et al. | |
| 2014/0160236 A1 | 6/2014 | Ozcan et al. | |
| 2014/0276173 A1* | 9/2014 | Banner | A61M 16/0051 600/533 |
| 2014/0300696 A1 | 10/2014 | Ozcan et al. | |
| 2015/0111201 A1 | 4/2015 | Ozcan et al. | |
| 2015/0153558 A1 | 6/2015 | Ozcan et al. | |
| 2015/0204773 A1 | 7/2015 | Ozcan et al. | |
| 2016/0070092 A1 | 3/2016 | Ozcan et al. | |
| 2016/0161409 A1 | 6/2016 | Ozcan et al. | |
| 2016/0327473 A1 | 11/2016 | Ozcan et al. | |
| 2016/0334614 A1 | 11/2016 | Ozcan et al. | |
| 2017/0011499 A1* | 1/2017 | Reinhardt | G01S 7/4815 |
| 2017/0153106 A1 | 6/2017 | Ozcan et al. | |
| 2017/0160197 A1 | 6/2017 | Ozcan et al. | |
| 2017/0168285 A1 | 6/2017 | Ozcan et al. | |
| 2017/0220000 A1 | 8/2017 | Ozcan et al. | |
| 2017/0357083 A1 | 12/2017 | Ozcan et al. | |
| 2017/0370809 A1* | 12/2017 | Miller-Lionberg | G01N 1/2202 |
| 2018/0003686 A1 | 1/2018 | Ozcan et al. | |
| 2018/0052425 A1 | 2/2018 | Ozcan et al. | |
| 2018/0196193 A1 | 7/2018 | Ozcan et al. | |
| 2018/0373921 A1 | 12/2018 | Di Carlo et al. | |
| 2019/0011882 A1* | 1/2019 | Gusyatin | G01N 15/1475 |
| 2019/0119737 A1 | 4/2019 | Ozcan et al. | |
| 2019/0137932 A1 | 5/2019 | Ozcan et al. | |
| 2019/0286053 A1 | 9/2019 | Ozcan et al. | |
| 2019/0294108 A1 | 9/2019 | Ozcan et al. | |
| 2019/0316172 A1 | 10/2019 | Ozcan et al. | |
| 2019/0321570 A1* | 10/2019 | Rubin | A61M 16/1065 |
| 2019/0333199 A1 | 10/2019 | Ozcan et al. | |
| 2019/0346369 A1 | 11/2019 | Ozcan et al. | |
| 2020/0103328 A1 | 4/2020 | Ozcan et al. | |
| 2020/0182765 A1* | 6/2020 | Chadha | G01N 15/0211 |
| 2021/0285864 A1* | 9/2021 | Ozcan | G06T 7/0004 |

FOREIGN PATENT DOCUMENTS

| WO | WO 2019/200289 | 10/2019 |
|---|---|---|
| WO | WO 2019/236569 | 12/2019 |
| WO | WO 2020/018154 | 1/2020 |

OTHER PUBLICATIONS

Bishara, Waheb et al., Lensfree on-chip microscopy over a wide field-of-view using pixel super-resolution, Optics Express 11181, vol. 18, No. 11, May 24, 2010.

Greenbaum, Alon et al., Imaging without lenses: achievements and remaining challenges of wide-field on-chip microscopy, Nat Methods. Sep. 2012; 9(9): 889-895, doi:10.1038/nmeth.2114.

Krizhevsky, Alex et al., ImageNet Classification with Deep Convolutional Neural Networks, undated (9pages).

Leskiewicz, Maciej et al., Improved real-time bio-aerosol classification using artificial neural networks, Atmos. Meas. Tech., 11, 6259-6270, 2018, https://doi.org/10.5194/amt-11-6259-2018.

Luo, Wei et al., Pixel super-resolution using wavelength scanning, Light: Science & Applications (2016) 5, e16060; doi:10.1038/lsa.2016.60.

Ruske, Simon et al., Evaluation of machine learning algorithms for classification of primary biological aerosol using a new UV-LIF spectrometer, Atmos. Meas. Tech., 10,695-708, 2017.

Wu, Yichen et al., Lensless digital holographic microscopy and its applications in biomedicine and environmental monitoring, Methods (2017), http://dx.doi.org/10.1016/j.ymeth.2017.08.013.

Wu, Yi-Chen et al., Air quality monitoring using mobile microscopy and machine learning, Light: Science & Applications (2017) 6, e17046; doi:10.1038/lsa.2017.46.

Wu, Yichen et al., Extended depth-of-field in holographic imaging using deep-learning-based autofocusing and phase recovery, Optica, vol. 5, No. 6, 704, Jun. 2018.

Wu, Yichen et al., Demosaiced pixel super-resolution for multiplexed holographic color imaging, Scientific Reports, 6:28601, DOI:10.1038/srep28601.

* cited by examiner

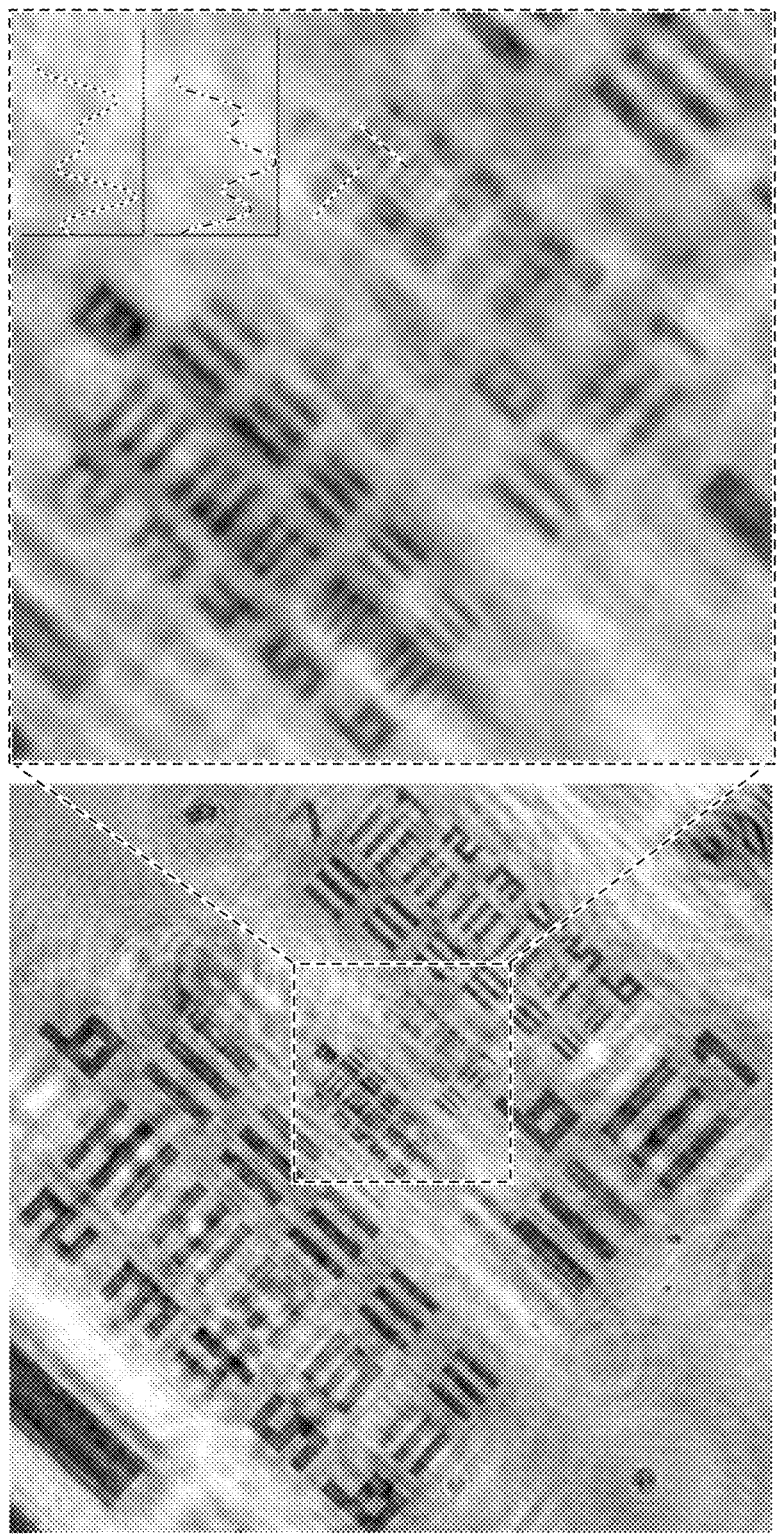

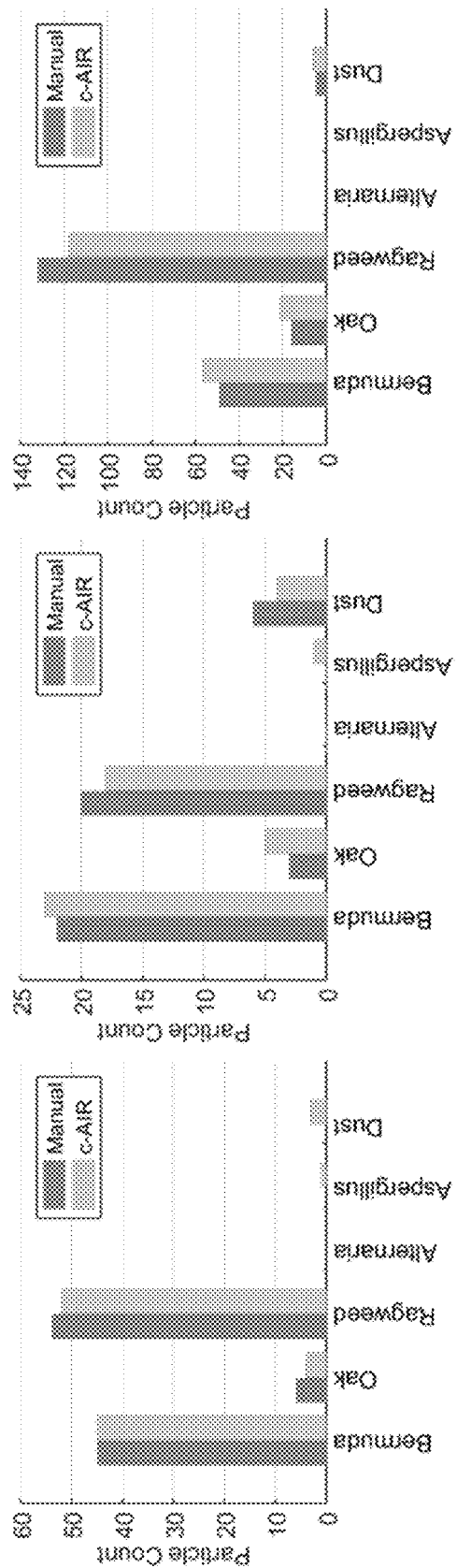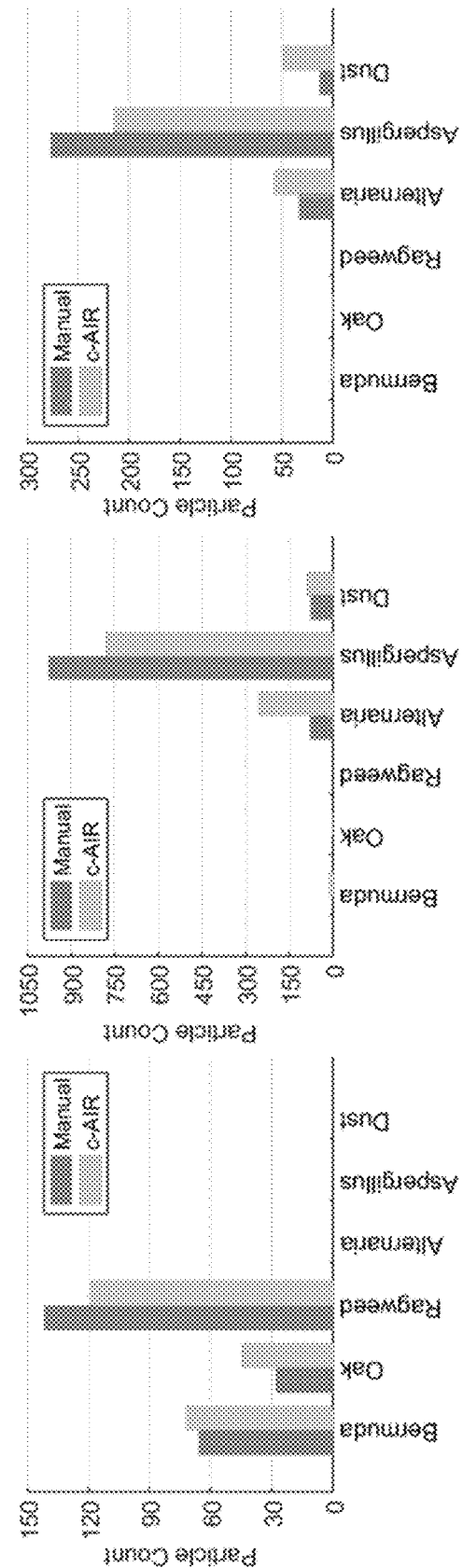

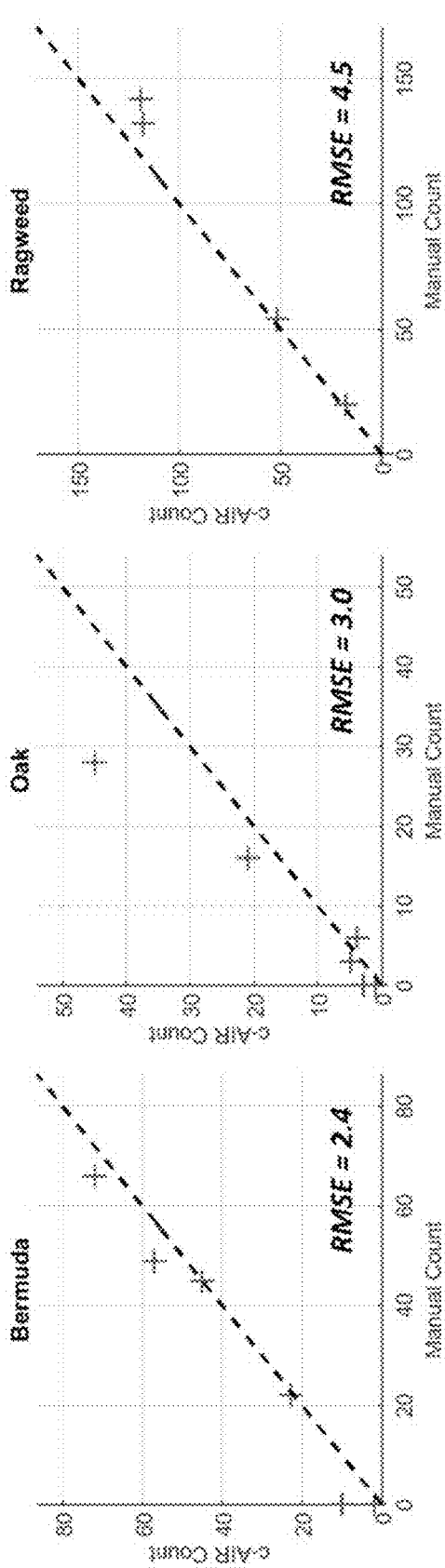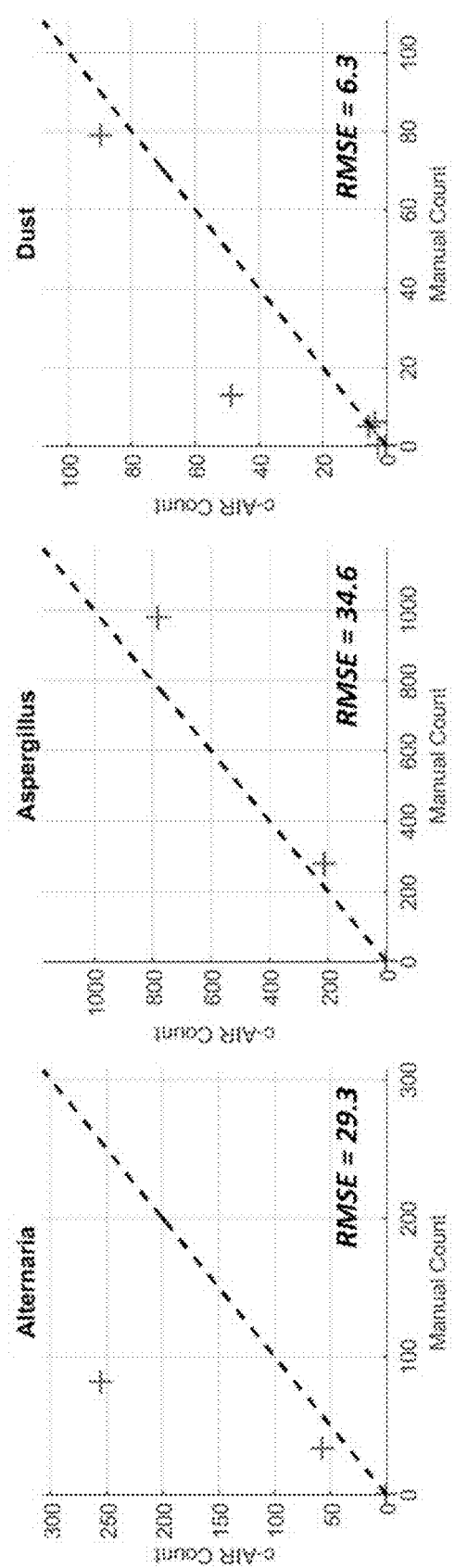
FIG. 10G, FIG. 10H, FIG. 10I, FIG. 10J, FIG. 10K, FIG. 10L (a)

| Manual Label | Network Classification | | | | | | Total |
|---|---|---|---|---|---|---|---|
| | Ber | Oak | RW | Alt | Asp | Dust | |
| Ber | 41 | 0 | 1 | 0 | 1 | 2 | 45 |
| Oak | 2 | 4 | 0 | 0 | 0 | 0 | 6 |
| RW | 2 | 0 | 51 | 0 | 0 | 1 | 54 |
| Alt | 0 | 0 | 0 | 0 | 0 | 0 | 0 |
| Asp | 0 | 0 | 0 | 0 | 0 | 0 | 0 |
| Dust | 0 | 0 | 0 | 0 | 0 | 0 | 0 |
| Total | 45 | 4 | 52 | 0 | 1 | 3 | 105 |

| Manual Label | Network Classification | | | | | | Total |
|---|---|---|---|---|---|---|---|
| | Ber | Oak | RW | Alt | Asp | Dust | |
| Ber | 21 | 0 | 0 | 0 | 0 | 1 | 22 |
| Oak | 0 | 3 | 0 | 0 | 0 | 0 | 3 |
| RW | 1 | 1 | 18 | 0 | 0 | 0 | 20 |
| Alt | 0 | 0 | 0 | 0 | 0 | 0 | 0 |
| Asp | 0 | 0 | 0 | 0 | 0 | 0 | 0 |
| Dust | 1 | 1 | 0 | 0 | 1 | 3 | 6 |
| Total | 23 | 5 | 18 | 0 | 1 | 4 | 51 |

| Manual Label | Network Classification | | | | | | Total |
|---|---|---|---|---|---|---|---|
| | Ber | Oak | RW | Alt | Asp | Dust | |
| Ber | 43 | 5 | 0 | 0 | 0 | 1 | 49 |
| Oak | 2 | 13 | 0 | 0 | 0 | 1 | 16 |
| RW | 11 | 3 | 117 | 0 | 0 | 1 | 132 |
| Alt | 0 | 0 | 0 | 0 | 0 | 0 | 0 |
| Asp | 0 | 0 | 0 | 0 | 0 | 0 | 0 |
| Dust | 1 | 0 | 1 | 0 | 0 | 3 | 5 |
| Total | 57 | 21 | 118 | 0 | 0 | 6 | 202 |

FIG. 11C (d)

| Manual Label | Network Classification | | | | | | Total |
|---|---|---|---|---|---|---|---|
| | Ber | Oak | RW | Alt | Asp | Dust | |
| Ber | 53 | 13 | 0 | 0 | 0 | 0 | 66 |
| Oak | 5 | 22 | 1 | 0 | 0 | 0 | 28 |
| RW | 14 | 10 | 118 | 0 | 0 | 0 | 142 |
| Alt | 0 | 0 | 0 | 0 | 0 | 0 | 0 |
| Asp | 0 | 0 | 0 | 0 | 0 | 0 | 0 |
| Dust | 0 | 0 | 0 | 0 | 0 | 0 | 0 |
| Total | 72 | 45 | 119 | 0 | 0 | 0 | 236 |

FIG. 11D (e)

| Manual Label | Network Classification | | | | | | | Total |
|---|---|---|---|---|---|---|---|---|
| | | Ber | Oak | RW | Alt | Asp | Dust | |
| | Ber | 0 | 0 | 0 | 0 | 0 | 0 | 0 |
| | Oak | 0 | 0 | 0 | 0 | 0 | 0 | 0 |
| | RW | 0 | 0 | 0 | 0 | 0 | 0 | 0 |
| | Alt | 1 | 0 | 0 | 74 | 3 | 4 | 82 |
| | Asp | 1 | 3 | 0 | 158 | 754 | 64 | 980 |
| | Dust | 8 | 0 | 0 | 24 | 25 | 22 | 79 |
| Total | | 10 | 3 | 0 | 256 | 782 | 90 | 1141 |

FIG. 11E (f)

| Manual Label | Network Classification | | | | | | | Total |
|---|---|---|---|---|---|---|---|---|
| | | Ber | Oak | RW | Alt | Asp | Dust | |
| | Ber | 0 | 0 | 0 | 0 | 0 | 0 | 0 |
| | Oak | 0 | 0 | 0 | 0 | 0 | 0 | 0 |
| | RW | 0 | 0 | 0 | 0 | 0 | 0 | 0 |
| | Alt | 2 | 0 | 0 | 25 | 3 | 4 | 34 |
| | Asp | 0 | 1 | 0 | 28 | 209 | 40 | 278 |
| | Dust | 0 | 0 | 0 | 5 | 3 | 5 | 13 |
| Total | | 2 | 1 | 0 | 58 | 215 | 49 | 325 |

FIG. 11F

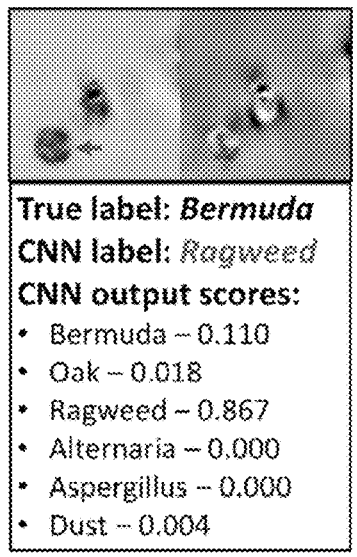
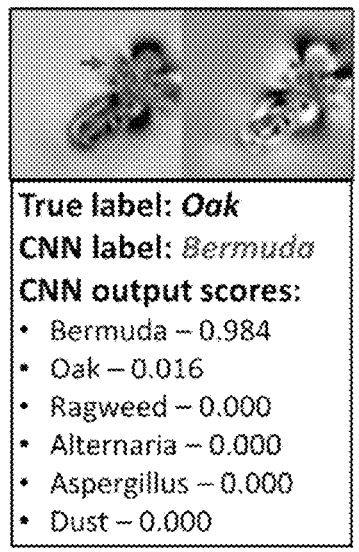
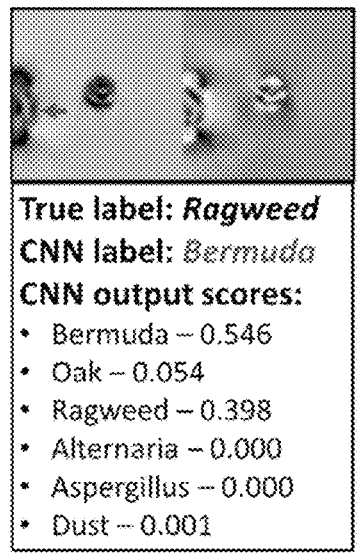
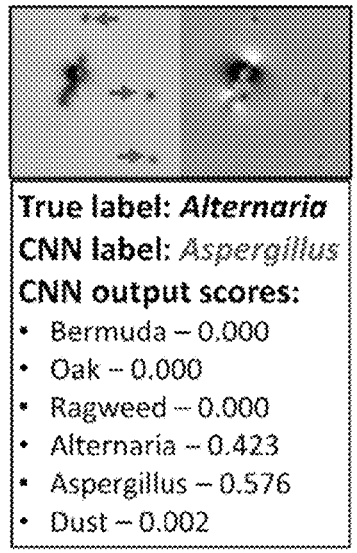
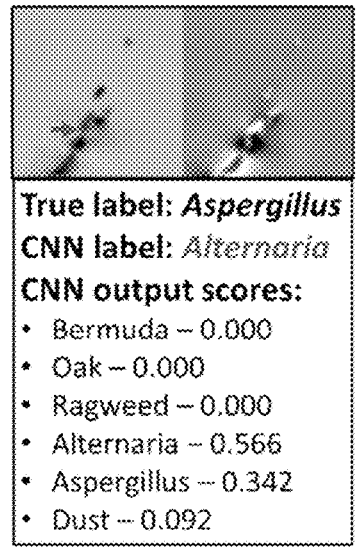
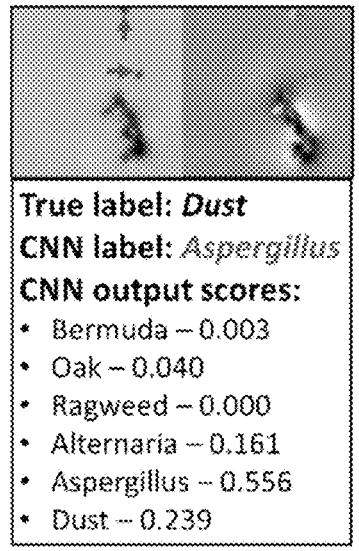
FIG. 12

LABEL-FREE BIO-AEROSOL SENSING USING MOBILE MICROSCOPY AND DEEP LEARNING

RELATED APPLICATION

This Application claims priority to U.S. Provisional Patent Application No. 62/838,149 filed on Apr. 24, 2019, which is hereby incorporated by reference in its entirety. Priority is claimed pursuant to 35 U.S.C. § 119 and any other applicable statute.

STATEMENT REGARDING FEDERALLY SPONSORED RESEARCH AND DEVELOPMENT

This invention was made with government support under Grant Number 1533983, awarded by the National Science Foundation. The government has certain rights in the invention.

TECHNICAL FIELD

The technical field generally relates to devices and methods for label-free aerosol particle sensing/screening using a portable or mobile microscope that uses trained deep neural networks to reconstruct images of the captured aerosols as well as classify or label the aerosol particles. The devices and methods have particular applicability to bio-aerosols.

BACKGROUND

A human adult inhales about seven liters of air every minute, which on average contains $10^2$-$10^3$ micro-biological cells (bio-aerosols). In some contaminated environments, this number can easily exceed $10^6$ bio-aerosols. These bio-aerosols include micro-scale airborne living organisms that originate from plants or animals, and include pollens, mold/fungi spores, bacteria, and viruses. Bio-aerosols are generated both naturally and anthropogenically, from e.g. animal houses, composting facilities, construction sites, and other human and animal activities. These bio-aerosols can stay suspended in the air for prolonged periods of time, remain at significant concentrations even far away from the generating site (up to one kilometer), and can even travel through continental distances. Basic environmental conditions, such as temperature and moisture level, can also considerably influence bio-aerosol formation and dispersion. Inhaled by a human, they can stay in the respiratory tract and cause irritation, allergies, various diseases including cancer and even premature death. In fact, bio-aerosols account for 5-34% of the total amount of indoor particulate matter (PM). In recent years, there has been increased interest in monitoring environmental bio-aerosols, and understanding their composition, to avoid and/or mitigate their negative impacts on human health, in both peacetime and in threat of biological attacks.

Currently, most of the bio-aerosol monitoring activities still rely on a technology that was developed more than fifty years ago. In this method, an aerosol sample is taken at the inspection site using a sampling device such as an impactor, a cyclone, a filter, or a spore trap. This sample is then transferred to a laboratory, where the aerosols are transferred to certain liquid media or solid substrates and inspected manually under a microscope or through culture experiments. The microscopic inspection of the sample usually involves labeling through a colorimetric or fluorescence stain(s) to increase the contrast of the captured bio-aerosols under a microscope. Regardless of the specific method that is employed, the use of manual inspection in a laboratory, following a field collection, significantly increases the costs and delays the reporting time of the results. Partially due to these limitations, out of ~10,000 air-sampling stations worldwide, only a very small portion of them have bio-aerosol sensing/measurement capability. Even in developed countries, bio-aerosol levels are only reported on a daily basis at city scales. As a result, human exposure to bio-aerosols is hard to quantify with the existing set of technologies.

Driven by this need, different techniques have been emerging towards potentially label-free, on-site and/or real-time bio-aerosol monitoring. In one of these techniques, the air is driven through a small channel, and an ultraviolet (UV) source is focused on a nozzle of this channel, exciting the auto-fluorescence of each individual bio-aerosol flowing through the nozzle. This auto-fluorescence signal is then captured by one or more photodetectors, used to differentiate bio-aerosols from non-fluorescent background aerosols. Recently, other machine learning algorithms have also been applied to classify bio-aerosols from their auto-fluorescence signals using a UV-LIF spectrophotometer. However, measuring auto-fluorescence in itself may not provide sufficient specificity towards classification. To detect weak auto-fluorescence signals, this design also requires strong UV sources, sensitive photodetectors and high-performance optical components, making the system relatively costly and bulky. Furthermore, the sequential read-out scheme in these flow-based designs also limits their sampling rate and throughput to <5 L/min. Alternative bio-aerosol detection methods rely on anti-bodies to specifically capture bio-aerosols of interest on e.g., a vibrational cantilever, or a surface plasmon resonance (SPR) substrate, which can then detect these captured bio-aerosols through a change in the cantilever vibrational frequency or a shift in the SPR spectrum, respectively. While these approaches provide very sensitive detection of a specific type of bio-aerosols, however, their performance can be compromised by non-specific binding and/or changes in the environmental conditions (e.g., temperature, moisture level, etc.), impacting the effectiveness of the surface chemistry. Moreover, the reliance to specific antibodies makes it harder for these approaches to scale up the number of target bio-aerosols and cover unknown targets. Bio-aerosol detection and composition analysis using Raman spectroscopy has also been demonstrated. However, due to weaker signal levels and contamination from background spectra, the sensitivities of these methods have been relatively low despite their expensive and bulky hardware; it is challenging to analyze or detect e.g., a single bio-aerosol within a mixture of other aerosols. It is also possible to detect bio-aerosols by detecting their genetic material (e.g., DNA), using polymerase chain reaction (PCR), enzyme-linked immunosorbent assays (ELISA) or metagenomics, all of which can provide high sensitivity and specificity. However, these detection methods are usually based on post-processing of bio-aerosols in laboratory environments (i.e., involves field sampling, followed by the transportation of the sample to a central laboratory for advanced processing), and are therefore low-throughput, also requiring an expert and the consumption of costly reagents. Therefore, there is still an urgent unmet need for accurate, label-free and automated bio-aerosol sensing to cover a wide range of bio-aerosols, ideally within a field-portable, compact and cost-effective platform.

SUMMARY

The device, in one embodiment, uses a combination of an impactor and a lens-less digital holographic on-chip microscope: bio-aerosol particles in air are captured on the impactor substrate at a sampling rate of 13 L/min. These collected bio-aerosol particles generate diffraction holograms recorded directly by an image sensor that is positioned right below the substrate (which is optically transparent). Each hologram contains information of the complex optical field, and therefore both the amplitude and phase information of each individual bio-aerosol are captured. After digital holograms of the bio-aerosol particles are acquired and transmitted to a computing device such as remote server (or a local PC, tablet, portable electronic device such as Smartphone), these holograms are rapidly processed through an image-processing pipeline (with image processing software), within a minute, reconstructing the entire field-of-view (FOV) of the device, i.e., 4.04 $mm^2$, over which the captured bio-aerosol particles are analyzed. Enabled by trained deep neural networks (implemented as convolutional neural networks (CNNs) in one preferred embodiment), the reconstruction algorithm first reconstructs both the amplitude and phase image of each individual bio-aerosol particle with sub-micron resolution, and then performs automatic classification of the imaged bio-aerosol particles into pre-trained classes and counting the density of each class in air (additional information or parameters of the bio-aerosol particles may also be output as well). To demonstrate the effectiveness of the device and method, the reconstruction and label-free sensing of five different types of bio-aerosols was performed: Bermuda grass pollen, oak tree pollen, ragweed pollen, *Aspergillus* spore, and *Alternaria* spore—as well as non-biological aerosols as part of the default background pollution. The Bermuda grass, oak tree and ragweed pollens have long been recognized as some of the most common grass, tree and weed-based allergens that can cause severe allergic reactions. Similarly, the *Aspergillus* and *Alternaria* spores are two of the most common mold spores found in air and can cause allergic reactions and various diseases. Furthermore, *Aspergillus* spores have been proven to be a culprit of asthma in children. Some of these mold species/sub-species can also generate mycotoxins that weaken the human immune system. The trained deep neural network (i.e., a trained CNN) is trained to differentiate these six different types of aerosol particles, achieving an accuracy of 94% using the mobile instrument. This label-free bio-sensing platform can be further scaled up to specifically detect other types of bio-aerosols by training it using purified populations of new target object types as long as these bio-aerosol particles exhibit unique spatial and/or spectral features that can be detected through the holographic imaging system.

This platform enables the automated label-free sensing and classification of bio-aerosols using a portable and cost-effective device, which is enabled by computational microscopy and deep-learning, which are used for both image reconstruction and particle classification. The mobile bio-aerosol detection device is hand-held, weighs less than 600 g, and its parts cost less than $200 under low-volume manufacturing. Compared to earlier results on PM measurements using mobile microscopy without any classification capability, this platform enables label-free and automated bio-aerosol sensing using deep learning (which is used for both image reconstruction and classification), providing a unique capability for specific and sensitive detection and counting of e.g., pollen and mold particles in air. The platform can find a wide range of applications in label-free aerosol sensing and environmental monitoring. This may include bio-aerosols and non-biological aerosols.

In one embodiment, a method of classifying aerosol particles using a portable microscope device includes capturing aerosol particles on a substrate. The substrate is optically transparent and tacky or sticky so that aerosol particles adhere thereto. One or more illumination sources in the portable microscope device then illuminate the substrate containing the captured aerosol particles. An image sensor disposed in the portable disposed microscope device and adjacent to the substrate then captures holographic images or diffraction patterns of the captured aerosol particles. The image files generated by the image sensor are then processed with image processing software contained on a local or remote computing device, wherein image processing comprises inputting the holographic images or diffraction patterns through a first trained deep neural network to output reconstructed amplitude and phase images of each aerosol particle at the one or more illumination wavelengths and wherein a second trained deep neural network receives as an input the outputted reconstructed amplitude and phase images of each aerosol particle at the one or more illumination wavelengths and outputs one or more of the following for each aerosol particle: a classification or label of the type of aerosol particle, a classification or label of the species of the aerosol particle, a size of the aerosol particle, a shape of the aerosol particle, a thickness of the aerosol particle, and a spatial feature of the particle.

In another embodiment, a system for classifying aerosol particles includes a portable, lens-free microscopy device for monitoring air quality. The device includes a housing, a vacuum pump configured to draw air into an impaction nozzle disposed in the housing, the impaction nozzle having an output located adjacent to an optically transparent substrate for collecting particles contained in the air, one or more illumination sources disposed in the housing and configured to illuminate the collected particles on the optically transparent substrate, and an image sensor disposed in the housing and located adjacent to the optically transparent, wherein the image sensor collects diffraction patterns or holographic images cast upon the image sensor by the collected particles. The system includes a computing device having one or more processors executing image processing software thereon and configured to receive the holographic images or diffraction patterns obtained from the portable, lens-free microscopy device, wherein the image processing software inputs the holographic images or diffraction patterns obtained at the one or more illumination wavelengths through a first trained deep neural network to output reconstructed amplitude and phase images of each aerosol particle and inputs the reconstructed amplitude and phase images of each aerosol particle in a second trained deep neural network and outputs one or more of the following for each aerosol particle: a classification or label of the type of aerosol particle, a classification or label of the species of the aerosol particle, a size of the aerosol particle, a shape of the aerosol particle, a thickness of the aerosol particle, and a spatial feature of the particle.

BRIEF DESCRIPTION OF THE DRAWINGS

FIGS. 6A and 6B illustrate a resolution test using a USAF 1951 test-target. The USAF target is put at an axial distance of 668 µm away from the sensor top. The finest resolvable line for both horizontal and vertical components is group 9, element 1, corresponding to a half-pitch linewidth of 0.98 µm. FIG. 6B is an enlarged view of the square region of FIG. 6A.

FIG. 8A shows cropped raw holograms.

FIGS. 10A-10F illustrates particle count histograms for bio-aerosol mixture experiments. Deep-learning based automatic bio-aerosol detection was performed and bio-aerosol particles were counted using the mobile device for six different experiments with varying bio-aerosol concentrations, and their comparisons against manual counting performed by a microbiologist under a benchtop scanning microscope with 40× magnification are shown.

FIGS. 10G-10L illustrate quantification of the counting accuracy for different types of aerosols. The dashed line refers to y=x. Root mean square error (RMSE) is also shown in each FIG.

FIGS. 11A-11F illustrates confusion matrices for bio-aerosol mixture experiments. In particular, the confusion matrices are shown for bio-aerosol sensing using the deep-learning based automatic bio-aerosol detection method (Network Classification) against the manual counting performed by an expert under a benchtop scanning microscope with 40× magnification (Manual Label) for six different bio-aerosol mixture experiments with varying concentrations. FIGS. 11A-11F correspond to the experiment shown in FIGS. 10A-10F, respectively.

FIG. 12 illustrates examples of cropped regions with more than one type of bio-aerosols per zoomed FOV. The red arrows point to the bio-aerosol(s) that fall(s) within the cropped region but belong(s) to a different class compared to the labeled bio-aerosol at the center of the FOV. These randomly occurring cases in the mixture sample confuse the CNN, leading to misclassifications.

FIG. 14A illustrates plant fragments misclassified as Bermuda grass pollens. FIG. 14B illustrates plant fragments misclassified as Ragweed pollens.

FIG. 15A shows the response spectra under 400-700 nm illumination for the red (R), blue (B) and two green (G1, G2) channels of the CMOS image sensor. FIG. 15B is the same as in FIG. 15A, but under 600-1200 nm illumination. The spectra are generated by measuring the image sensor response while scanning the illumination wavelength. Using an infrared illumination at 850 nm, all the four channels have equally strong response, effectively converting a color image sensor into a monochrome one.

DETAILED DESCRIPTION OF THE ILLUSTRATED EMBODIMENTS

Figure 1:
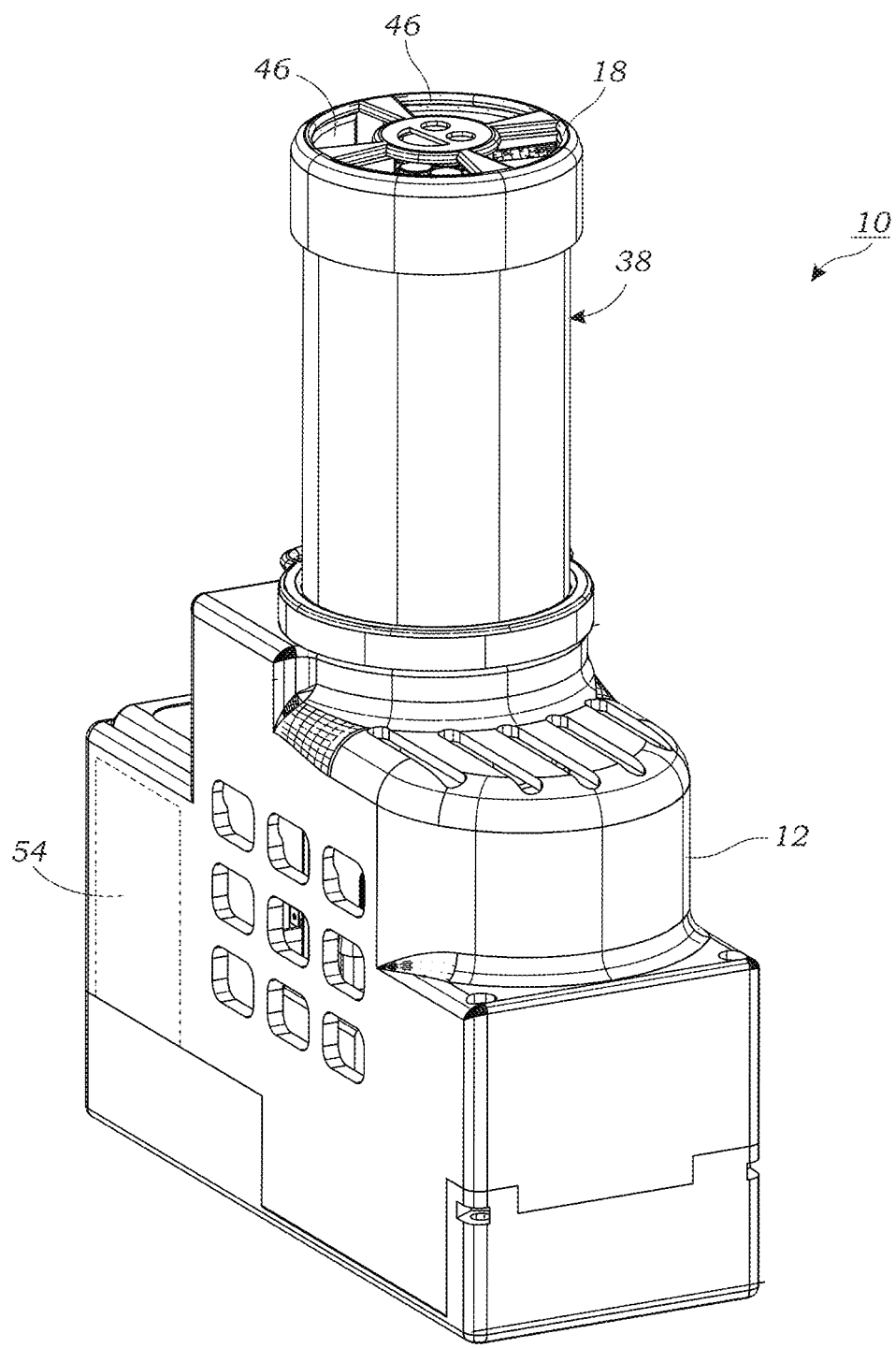
FIG. 1 illustrates a perspective view of the lens-free microscope device according to one embodiment.
Figure 2:
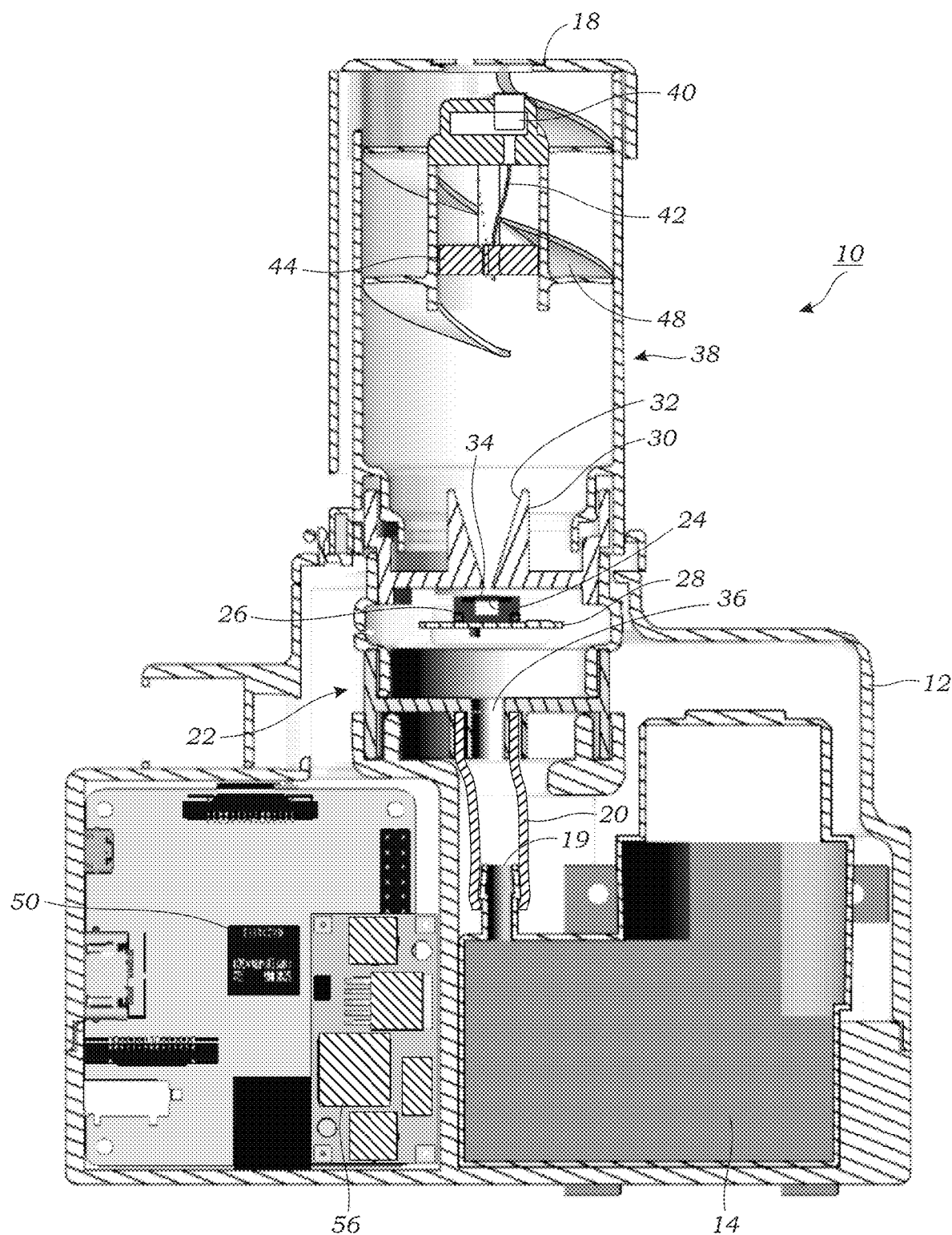
FIG. 2 illustrates a cross-sectional view of the lens-free microscope device of FIG. 1.

FIGS. 1, 2, 5, and 9 illustrate a lens-free microscope device 10 that is used for imaging of aerosol samples. The lens-free microscope device 10 is advantageously a handheld portable device that may be easily transported and used at various locations. The lens-free microscope device 10 is lightweight, weighing less than about 1.5 pounds in some embodiments. With reference to FIGS. 1 and 2, the lens-free microscope device 10 includes a housing 12 that holds the various components of the lens-free microscope device 10.

The housing 12 may be made of a rigid polymer or plastic material, although other materials (e.g., metals or metallic materials) and material combinations may be used as well. As best seen in FIG. 2, a vacuum pump 14 is located within the housing 12. The vacuum pump 14 is configured to draw air into an inlet 18 (seen in FIGS. 1 and 2) located in an extension portion 38 of the housing 12. An example of a commercially available vacuum pump 14 that is usable with the lens-free microscope device 10 includes the Micro 13 vacuum pump (Part No. M00198) available from Gtek Automation, Lake Forrest, Calif. which is capable of pumping air at a rate of thirteen (13) liters per minute. Of course, other vacuum pumps 14 and different flow rates may be used. The vacuum pump 14 includes a nipple or port 19 (FIG. 2) that is used as the inlet to the vacuum pump 14. A corresponding nipple, port, or vent (not illustrated) located on the vacuum pump 14 is used for exhaust air from the vacuum pump 14. The inlet nipple or port 19 is coupled to segment of tubing 20 as seen in FIG. 2 that is connected to an air sampler assembly 22.

The air sampler assembly 22 contains an image sensor 24 (seen in FIGS. 2, 3, 4) that is used to obtain holographic images or diffraction patterns on particles 100 that are collected as explained herein. The image sensor 24 may include, for example, a color CMOS image sensor but it should be appreciated that other image sensor types may be used. In experiments described herein, a color CMOS image sensor 24 or chip with a 1.12 µm pixel size was used although even smaller pixel sizes may be used to improve the resolution of the lens-free microscope device 10. The image sensor 24 is located on a support 26 (FIG. 3) that is positioned atop a printed circuit board (PCB) 28 that contains operating circuitry for the image sensor 24.

Figure 3:
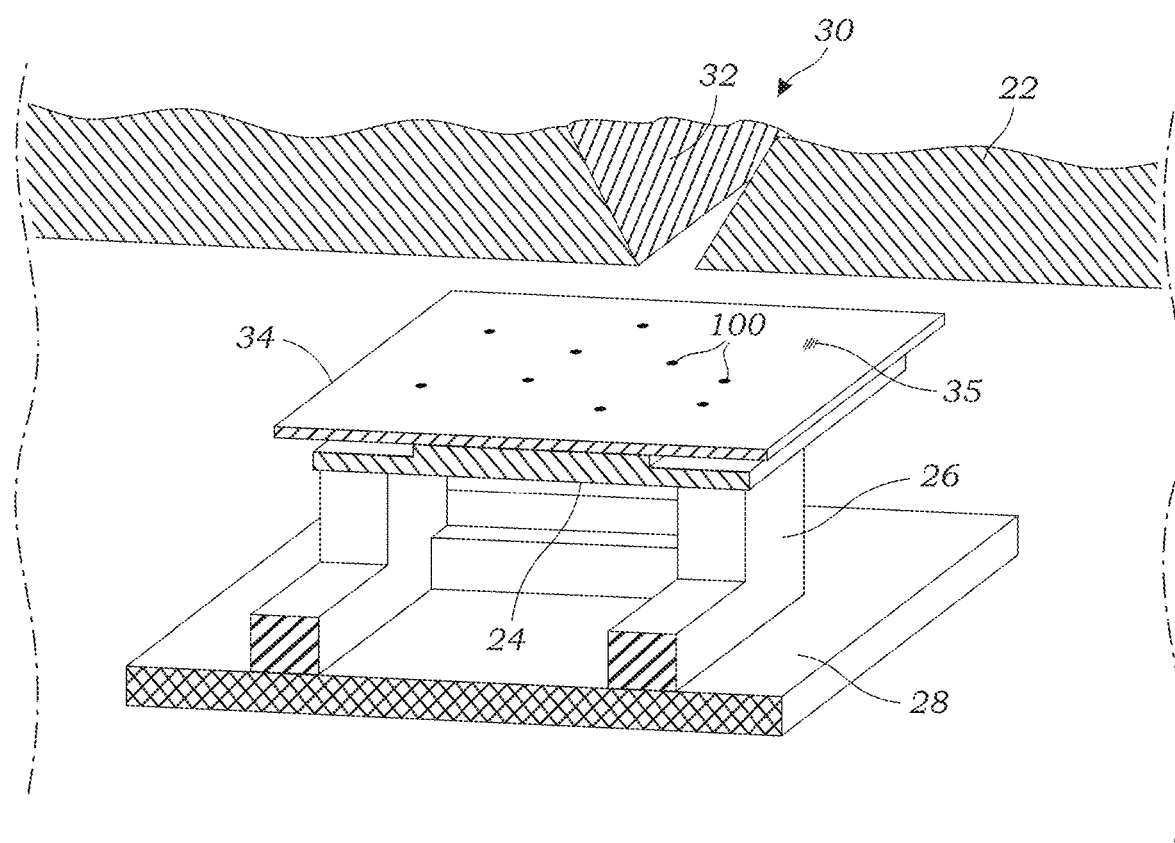
FIG. 3 illustrates a close-up perspective view the output of the impaction nozzle and the image sensor that is located on a support that is positioned atop a printed circuit board (PCB).

The air sampler assembly 22 further includes an impaction nozzle 30 (seen in FIGS. 2 and 4) that is used to trap or collect aerosol particles 100 that are sampled from the sample airstream that is pumped through the microscope device 10 using the vacuum pump 14. The impaction nozzle 30 includes a tapered flow path 32 that drives the airstream through the impaction nozzle 30 at high speed. The tapered flow path 32 terminates in a narrow opening (e.g., rectangular shaped) through which the air passes. The impaction nozzle 30 further includes an optically transparent substrate 34 (FIGS. 2-4) that is disposed adjacent to the narrow opening of the tapered flow path 32 (best seen in FIG. 4). The substrate 34 may include a glass slide, cover slip, or the like. The substrate 34 may be made from a glass, plastic, or polymer material. The optically transparent substrate 34 includes a sticky or tacky material 35 (e.g., collection media) on the side facing the output of the tapered flow path 32 as seen in FIG. 3. Thus, the optically transparent substrate 34 with the sticky or tacky material 35 is placed to directly face the high velocity airstream that passes through the impaction nozzle 30. The particles 100 (seen in FIGS. 3 and 4) contained within the airstream impact the optically transparent substrate 34 and are collected or trapped on the surface of the optically transparent substrate 34 for imaging. The airstream continues around the sides of the optically transparent substrate 34 (as seen by arrows in FIG. 4) where it exits via an orifice 36 as seen in FIG. 2 that connects to tubing 20. In one embodiment, the impaction nozzle 30 is formed using the upper cassette portion of the commercially available Air-O-Cell® Sampling Cassette from Zefon International, Inc. The upper cassette portion of the Air-O-Cell® Sampling Cassette includes the tapered flow path 32 as well as a coverslip (e.g., optically transparent substrate 34) containing collection media.

The optically transparent substrate 34 is located immediately adjacent to the image sensor 24. That is to say the airstream-facing surface of the optically transparent substrate 34 is located less than about 10 mm and in other embodiments less than about 5 mm from the active surface of the image sensor 24 in some embodiments. In other embodiments, the airstream-facing surface of the optically transparent substrate 34 is located less than 4 mm, 3 mm, 2 mm, and in a preferred embodiment, less than 1 mm. In one embodiment, the optically transparent substrate 34 is placed directly on the surface of the image sensor 24 to create a distance of around 400 µm between the particle-containing surface of the optically transparent substrate 34 and the active surface of the image sensor 24. The particle-containing surface of the optically transparent substrate 34 is also located close to the impaction nozzle 30, for example, around 800 µm in one embodiment. Of course, other distances could be used provided that holographic images and/or diffraction patterns of captured particles 100 can still be obtained with the image sensor 24.

Figure 4:
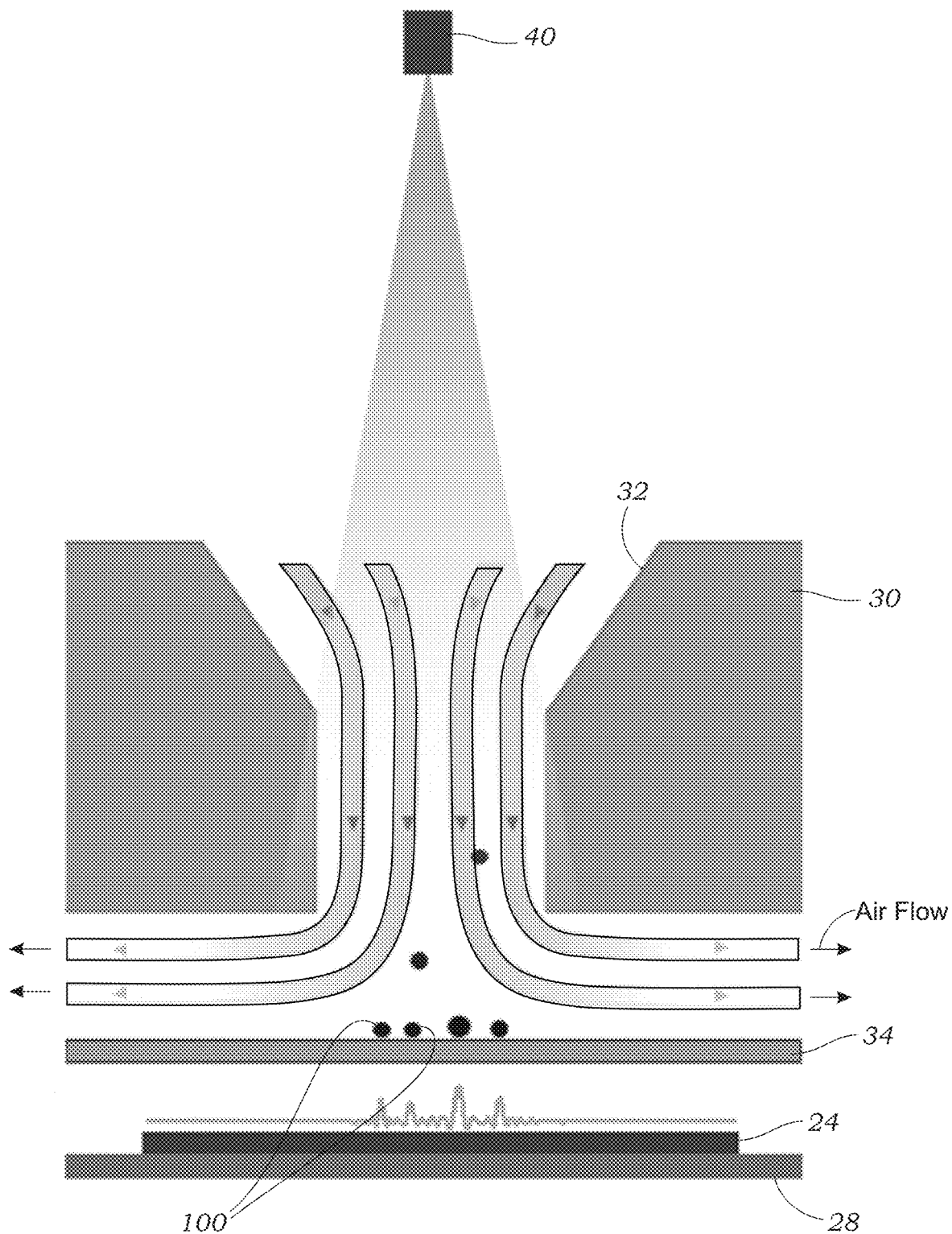
FIG. 4 schematically illustrates airflow containing particles passing through the impaction nozzle. Particles are captured on the optically transparent substrate and imaged using the image sensor. Arrows indicated direction of airflow.
Figure 9:
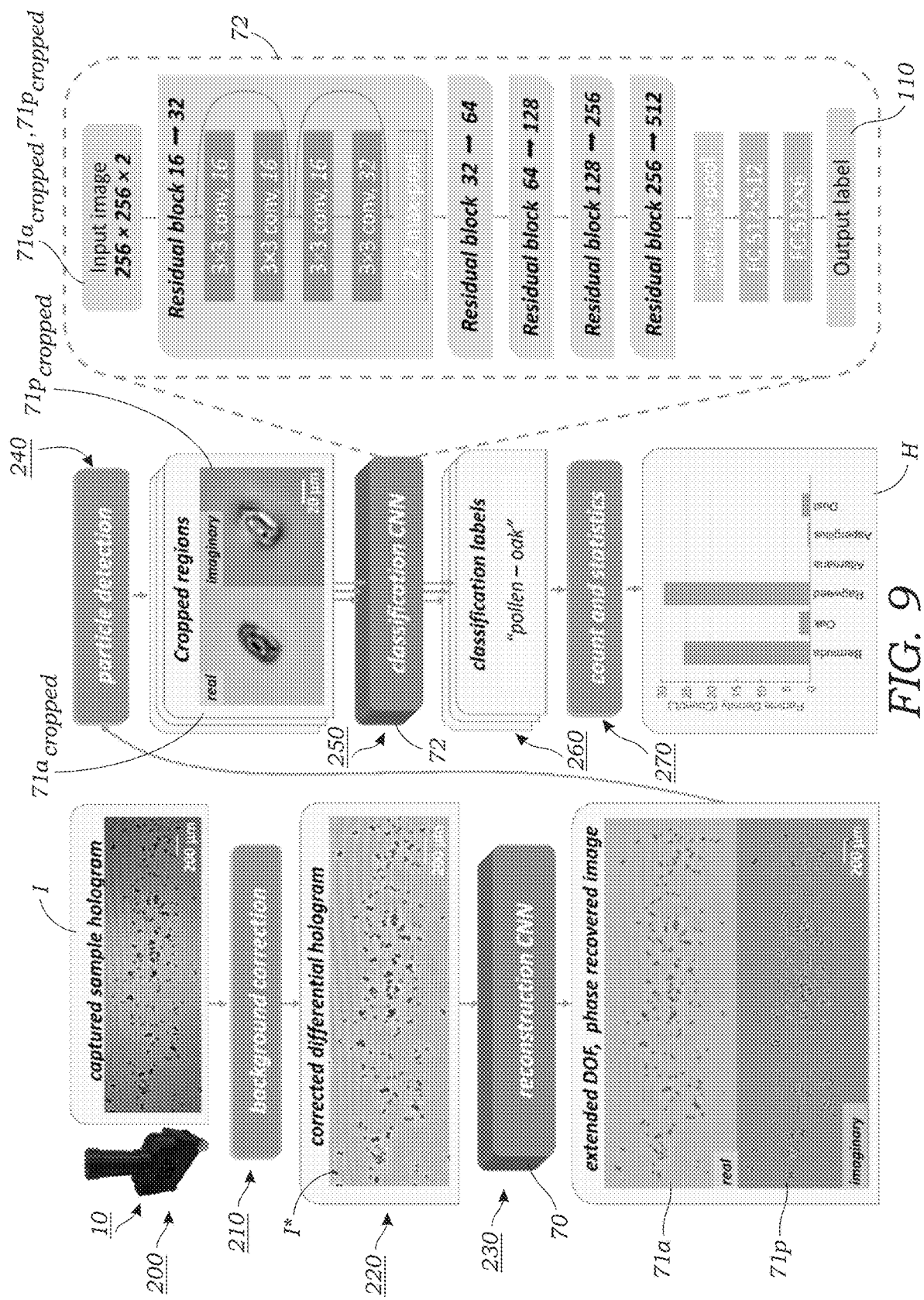
FIG. 9 schematically illustrates the image reconstruction and bio-aerosol classification work-flow. The architecture of the classification deep neural network (CNN) is also illustrated: cony: convolutional layer. FC: fully-connected layer.

Referring to FIGS. 2 and 4, the housing 12 of the lens-free microscope device 10 includes an extension portion 38 that houses one or more illumination sources 40. In one embodiment, one or more light emitting diodes (LEDs) are used for the one or more illumination sources 40. Each LED 40 is coupled to an optical fiber 42 (FIG. 2) that terminates in a header 44 for illuminating the optically transparent substrate 34. The fiber-coupled LEDs 40 generate partially coherent light that travels along an optical path from the end of the optical fiber(s) 42 through the tapered flow path 32 and onto the optically transparent substrate 34. The ends of the optical fibers 42 are located several centimeters away from the active surface of the image sensor 24 (e.g., 8 cm). Laser diodes may also be used for the illumination sources 40 (As explained herein a VCSEL diode was used for the light source). As an alternative to optical fibers 42 an aperture formed in the header 44 may be used to illuminate the optically transparent substrate 34 with partially coherent light. In one embodiment, each LED 40 has a center wavelength or range that is of a different color (e.g., red, green, blue). While multiple LEDs 40 are illustrated it should be appreciated that in other embodiments, only a single LED 40 or laser diode 40 may be needed. Using VCSEL illumination, the aerosol samples, which were captured by the collection media on the optically transparent substrate 34, cast in-line holograms or diffraction patterns of the captured particles 100 that are captured by the image sensor 24. These holograms or diffraction patterns are recorded by the image sensor 24 for holographic reconstruction and further processing to classify the aerosol particles 100. The images are saved as image files (I) which are then processes as described below (FIG. 9). As seen in FIG. 1, air that is to be tested or sampled by the lens-free microscope device 10 enters through openings 46 located at the end of the extension portion 38 of the housing 12 that function as the inlet 18. A spiraled inner surface 48 as seen in FIG. 2 is formed in the interior of the extension portion 38 to limit ambient light from reaching the image sensor 24.

The lens-free microscope device 10 includes one or more processors 50 (FIG. 2) contained within the housing 12 which are configured, in one embodiment, to control the vacuum pump 14 and the one or more illumination sources 40 (e.g., VCSEL driver circuitry). A separate VCSEL driver circuit (TLC5941 available from Texas Instruments) was used to drive the VCSEL diode 40. It should be understood, however, that any number of different computing solutions may be employed to control the vacuum pump 14 and illumination sources 40. These include custom-designed application-specific integrated circuits (ASICS) or custom programmable open-architecture processors and/or microcontrollers. In one embodiment, the one or more processors 50 (FIG. 5) include wired and/or wireless communication link (e.g., Bluetooth®, Wi-Fi, or near-field communication) that is used to transmit images obtained from the image sensor 24 to a separate computing device 52 such as that illustrated in FIG. 5. For example, images I obtained with the image sensor 24 may be transferred to a separate computing device 52 through a wired communication link that uses a USB cable or the like. The computing device 52 may be locally disposed with the lens-free microscope device 10 (e.g., in the same geographic location) or the computing device 52 may be remotely located away from the lens-free microscope device 10 (e.g., a server or the like in a cloud computing environment). Similarly, the one or more processors 50 may contain a wireless communication link or functionality to that image files may be wireless transmitted to a computing device 52 using a Wi-Fi or Bluetooth® connection. The images (I) are then processed by image processing software 66 contained in the computing device 52. In an alternative embodiment, one or more functions of the computing device 52 including image processing may be carried out using one or more on-board processors 50 of the lens-free microscope device 10. In this regard, the computing device 52 may reside within or is otherwise associated with the lens-free microscope device 10. In some embodiments, the one or more processors 50 may take the role of the computing device 52 where control of the lens-free microscope device 10 is performed in addition to image processing.

The one or more processors 50, the one or more illumination sources 40, and the vacuum pump 14 are powered by an on-board battery 54 as seen in FIG. 1 that is contained within the housing 12. The battery 54 may, in one embodiment, be a rechargeable battery. Alternatively, or in conjunction with the battery 54, a corded power source may be used to power the on-board components of the lens-free microscope device 10. With reference to FIG. 2, voltage control circuitry 56 is provided to provide the one or more processors with the required voltage (e.g., 5V DC) as well as the vacuum pump (12V DC).

Figure 5:
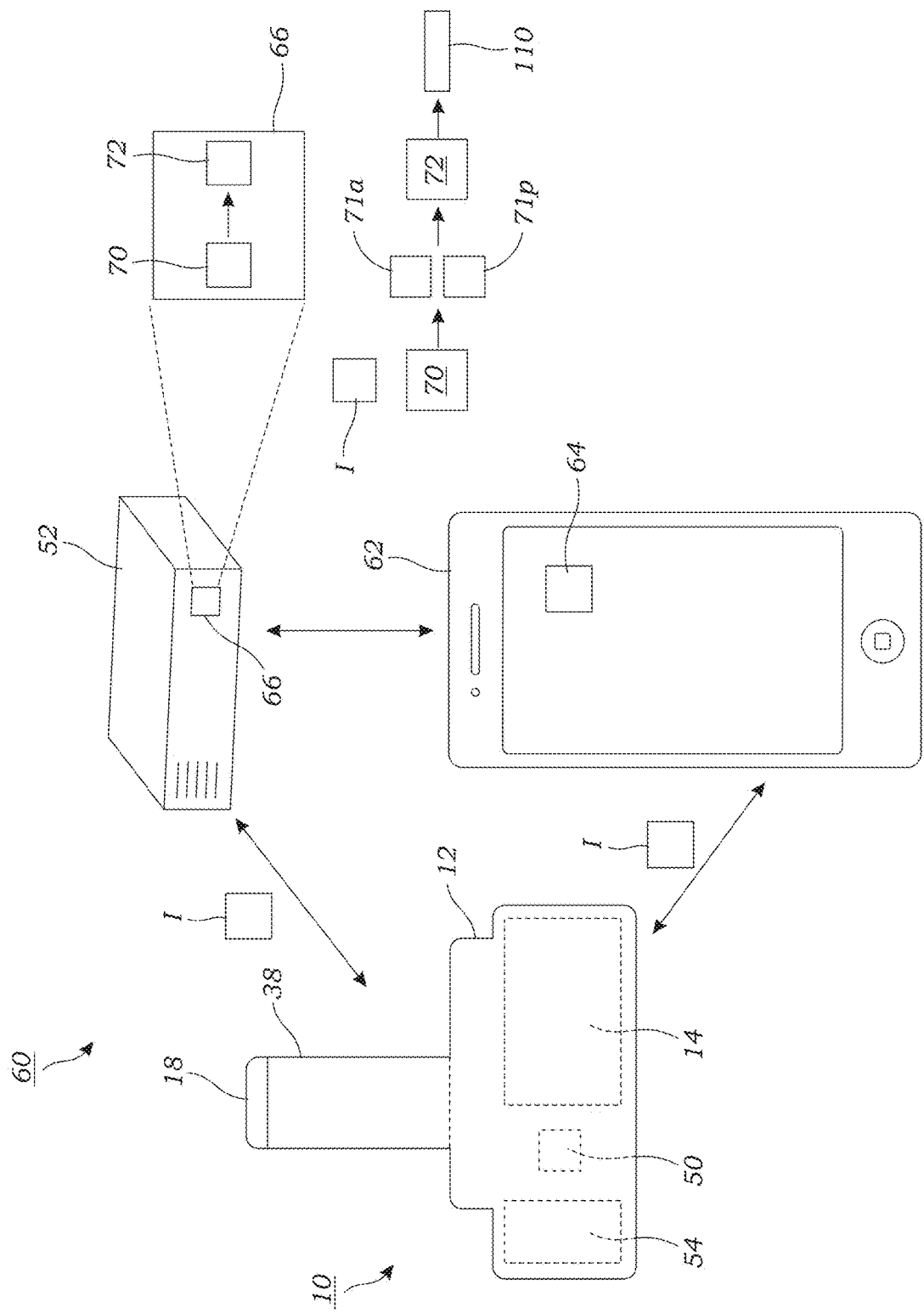
FIG. 5 illustrates a schematic view of a system that uses the lens-free microscope device of FIGS. 1-2. The system includes a computing device (e.g., server) and a portable electronic device (e.g., mobile phone). Of course, the results may be displayed on any computing device and is not limited to a portable electronic device.

FIG. 5 illustrates a schematic view of a system 60 that uses the lens-free microscope device 10 described herein. The system 60 includes a computing device 52 that is used to generate and/or output reconstructed particle images (containing phase and/or amplitude information of the particles 100), particle size data, particle density data, particle shape data, particle thickness data, spatial feature(s) of the particles, and/or particle type or classification data from holographic images or diffraction patterns of particles 100 captured on the optically transparent substrate 34. The computing device 52 contains image processing software 66 thereon that processes the raw image files (I) obtained from the image sensor 24. The image processing software 66 performs image reconstruction as well as classification using two separate trained deep neural networks 70, 72.

The image processing software 66 can be implemented in any number of software packages and platforms (e.g., Python, TensorFlow, MATLAB, C++, and the like). A first trained deep neural network 70 is executed by the image processing software 66 and is used to output or generate reconstructed amplitude and phase images of each aerosol particle 100 that were illuminated by the one or more illumination sources 40. As seen in FIG. 5, the raw image files (I) that contain the holographic images or diffraction patterns of the captured aerosol particles 100 are input to the first trained deep neural network 70 and outputs a reconstructed amplitude image 71*a* and phase image 71*p*. The second trained deep neural network 72 is executed by the image processing software 66 and receives as an input the outputted reconstructed amplitude and phase images 71*a*, 71*p* of each aerosol particle 100 (i.e., the output of the first trained deep neural network 70) at the one or more illumination wavelengths from the illumination sources 40 and outputs a classification or label 110 of each aerosol particle 100.

The classification or label output 110 that is generated for each aerosol particle 100 may include the type of particle 100. Examples of different "types" that may be classified using the second trained deep neural network 72 may, in some embodiments, include higher level classification types such as whether the particle 100 was organic or inorganic. Additional types contemplated by the "type" that is output by the second trained deep neural network 72 may include whether the particle 100 was plant or animal. Additional examples of "types" that can be classified include a generic type for the particle 100. Exemplary types that can be output for the particles 100 include classifying particles 100 as pollen, mold/fungi, bacteria, viruses, dust, dirt. In other embodiments, the second trained deep neural network 72 outputs even more specific type information for the particles 100. For example, rather than merely identify a particle 100 as pollen, the second trained deep neural network 72 may output the exact source or species of the pollen (e.g., Bermuda grass pollen, oak tree pollen, ragweed pollen). The same is true for other particles types (e.g., *Aspergillus* spores, *Alternaria* spores).

The second trained deep neural network 72 may also output other information or parameter(s) for each of the particles 100. This information may include a label or other indicia that is associated with each particle 100 (e.g., appended to each identified particle 100). This other information or parameter(s) beyond particle classification data (type or species) may include a size of the aerosol particles (e.g., mean or average diameter or other dimension), a shape of the aerosol particle (e.g., circular, oblong, irregular, or the like), a thickness of the aerosol particle, and a spatial feature of the particle (e.g., maximum intensity, minimum intensity, average intensity, area, maximum phase).

The image processing software 66 may be broken into one or more components or modules with, for example, reconstruction being performed by one module (the runs the first trained deep neural network 70) and another module (the runs the second trained deep neural network 72) performing the deep learning classification. The computing device 52 may include a local computing device 52 that is co-located with the lens-free microscope device 10. An example of a local computing device 52 may include a personal computer, laptop, or tablet PC or the like. Alternatively, the computing device 52 may include a remote computing device 52 such as a server or the like. In the later instance, image files obtained from the image sensor 24 may be transmitted to the remote computing device 52 using a Wi-Fi or Ethernet connection. Alternatively, image files may be transferred to a portable electronic device first which are then relayed or re-transmitted to the remote computing device 52 using the wireless functionality of the portable electronic device 62 (e.g., Wi-Fi or proprietary mobile phone network). The portable electronic device may include, for example, a mobile phone (e.g., Smartphone) or a tablet PC or iPad®. In one embodiment, the portable electronic device 62 may include an application or "app" 64 thereon that is used to interface with the lens-free microscope device 10 and display and interact with data obtained during testing. For example, the application 64 of the portable electronic device 62 may be used to control various operations of the lens-free microscope device 10. This may include controlling the vacuum pump 14, capturing image sequences, and display of the results (e.g., display of images of the particles 100 and classification results 110 for the particles 100).

Results and Discussion

Quantification of Spatial Resolution and Field-of-View

A USAF-1951 resolution test target is used to quantify the spatial resolution of the device 10. FIGS. 6A and 6B shows the reconstructed image of this test target, where the smallest resolvable line is group nine, element one (with a line width of 0.98 µm), which in this case is limited by the pixel pitch of the image sensor chip (1.12 µm). This resolution is improved by two-fold compared to prior work owing to higher coherence of the laser diode, a smaller pixel pitch of the image sensor (1.12 µm), and using all four Bayer channels of the color image sensor chip under 850 nm illumination, where an RGB image sensor behaves similar to a monochrome sensor. For the current bio-aerosol sensing application, this resolution provides accurate detection performance, revealing the necessary spatial features of the particles 100 in both the phase and amplitude image channels detailed below. In case future applications require better spatial resolution to reveal even finer spatial structures of some target bio-aerosol particles 100, the resolution of the device 10 can be further improved by using an image sensor 24 with a smaller pixel pitch, and/or by applying pixel super-resolution techniques that can digitally achieve an effective pixel <0.5 µm.

In the design of the tested device 10, the image sensor 24 (i.e., image sensor chip) has an active area of 3.674 mm×2.760 mm=10.14 mm$^2$, which would normally be the sample FOV for a lens-less on-chip microscope. However, the imaging FOV is smaller than this because the sampled aerosol particles 100 deposit directly below the impaction nozzle 30, thus the active FOV of the mobile device 10 is defined by the overlapping area of the image sensor 24 and the impactor nozzle 30, which results in an effective FOV of 3.674 mm×1.1 mm=4.04 mm$^2$. This FOV can be further increased up to the active area of the image sensor 24 by customizing the impactor design with a larger nozzle 30 width.

Label-Free Bio-Aerosol Image Reconstruction

Figure 7A:
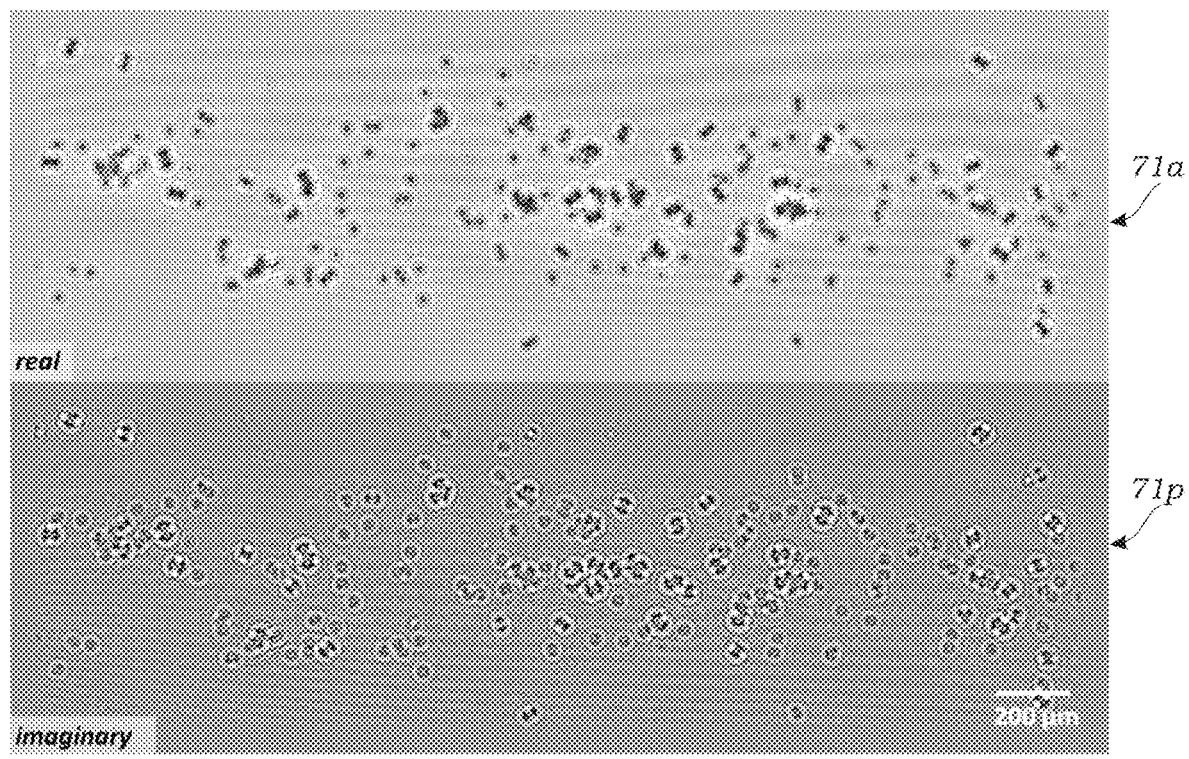
FIG. 7A illustrates the real and imaginary channels of the complex back-propagated hologram.

For each bio-aerosol measurement, two holograms are taken (before and after sampling the air) by the mobile device 10, and their per-pixel difference is calculated forming a differential hologram as described below. This differential hologram is numerically back-propagated in free space by an axial distance of ~750 µm to roughly reach the object plane of the sampling surface of the transparent substrate 34. This axial propagation distance does not need to be precisely known, and in fact all the aerosol particles 100 within this back-propagated image are automatically autofocused and phase recovered at the same time using the first deep neural network 700 that was trained with out-of-focus holograms of particles (within +/−100 µm of their corresponding axial position) to extend the depth-of-field (DOF) of the reconstructions (see e.g., FIGS. 7A and 7B).

This feature of the neural net is extremely beneficial to speed up auto-focusing and phase recovery steps since it reduces the computational complexity of the reconstructions from O(n·m) to O(1), where n refers to the number of aerosols within the FOV and m refers to the axial search range that would have been used for auto-focusing each particle using classical holographic reconstruction methods that involve phase recovery. In this regard, deep learning is crucial to rapidly reconstruct and auto-focus each particle 100 phase image 71p and amplitude image 71a using the mobile device 10.

Figure 8A:
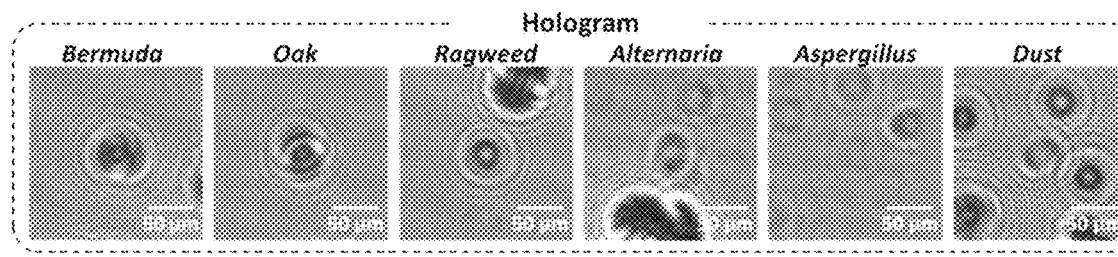
FIG. 8A illustrates examples of reconstructed images of different types of bio-aerosols.
Figure 8B:
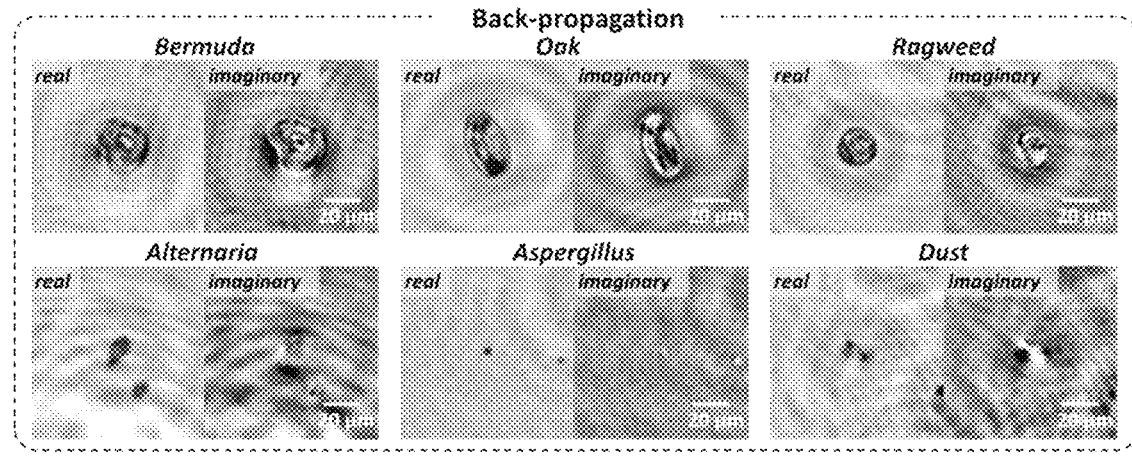
FIG. 8B illustrates back-propagated holographic reconstructions of FIG. 8A.
Figure 8C:
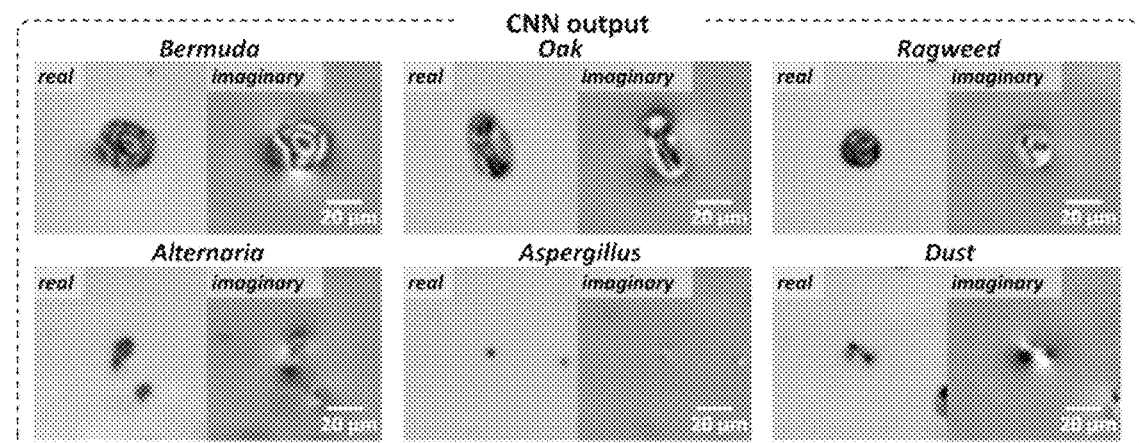
FIG. 8C illustrate CNN-based hologram reconstructions of the corresponding images of FIG. 8B.
Figure 8D:
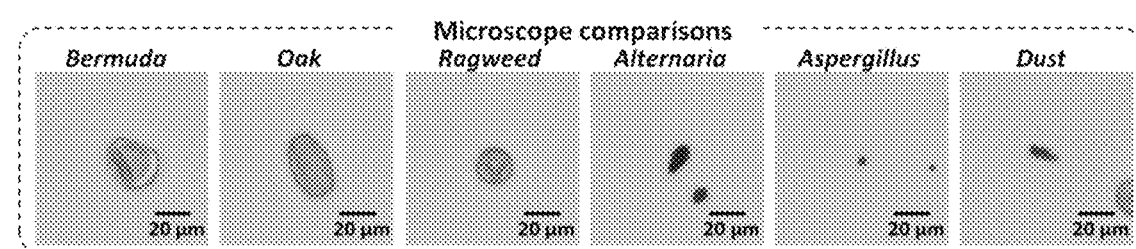
FIG. 8D illustrates corresponding regions of interest imaged by a benchtop scanning microscope with 40× magnification.

To illustrate the reconstruction performance of this method, FIGS. 8A-8C shows the raw holograms (FIG. 8A), back-propagation (FIG. 8B) and neural network results (FIG. 8C) corresponding to six different cropped region-of-interests (ROIs), one for each of the six classes used herein (Bermuda grass pollen, oak tree pollen, ragweed pollen, *Alternaria* mold spores, *Aspergillus* mold spores, and generic dust). The propagation distance (750 µm) is not exact for all these particles 100, which would normally result in de-focused images. This defocus is corrected automatically by the trained neural network 70, as shown in FIG. 8C. In addition, the twin-image and self-interference artifacts of holographic imaging (e.g., the ripples at the background of FIG. 8B are also eliminated, demonstrating phase-recovery in addition to auto-focusing on each captured particle 100. Microscope comparisons captured under a 20× objective (NA=0.75) with a 2× adapter are also shown for the same six ROIs (FIG. 8D).

The neural network outputs (FIG. 8C) clearly illustrates the morphological differences among these different aerosol particles 100, in both the real and imaginary channels (71a, 71p) of the reconstructed images, providing unique features for classification of these aerosol particles 100.

Bio-Aerosol Image Classification

A separate trained deep neural network 72 (e.g., convolutional neural network (CNN)) is used that takes a cropped ROI (after the image reconstruction and auto-focusing step detailed earlier) and automatically assigns one of the six class labels for each detected aerosol particle 100 (see FIG. 9). In this particular experiment, the six classification labels 110 included particle type: Bermuda, Oak, Ragweed, *Alternaria*, *Aspergillus*, and Dust. Of course, as explained herein, different classification labels or types 110 may be output from the second trained deep neural network 72. Table 1 reports the classification precision and recall on the testing set, as well as their harmonic mean, known as F-number (F #), which are defined as:

$$\text{Precision} = \frac{\text{True Positive}}{\text{True Positive} + \text{False Positive}} \quad (1)$$

$$\text{Recall} = \frac{\text{True Positive}}{\text{True Positive} + \text{False Negative}} \quad (2)$$

$$F\# = \frac{2 \cdot \text{Precision} \cdot \text{Recall}}{\text{Precision} + \text{Recall}} \quad (3)$$

TABLE 1

| | This paper | | | AlexNet | | | SVM | | |
|---|---|---|---|---|---|---|---|---|---|
| | Preci. | Recall | F# | Preci. | Recall | F# | Preci. | Recall | F# |
| Bermuda | 0.929287 | 0.851852 | 0.887052 | 0.893859 | 0.846561 | 0.869969 | 0.769231 | 0.61674 | 0.684597 |
| Oak | 0.930464 | 0.975694 | 0.952542 | 0.940972 | 0.940972 | 0.940972 | 0.84375 | 0.690341 | 0.799375 |
| Ragweed | 0.964427 | 0.976 | 0.970179 | 0.931959 | 0.98 | 0.955166 | 0.730077 | 0.8875 | 0.801128 |
| *Alternaria* | 0.962963 | 0.962963 | 0.962963 | 0.933333 | 0.972222 | 0.952381 | 0.587179 | 0.970339 | 0.731629 |
| *Aspergillus* | 0.848485 | 0.937799 | 0.890909 | 0.795556 | 0.856459 | 0.824885 | 0.782222 | 0.671756 | 0.722793 |
| Dust | 0.944186 | 0.849372 | 0.894273 | 0.843602 | 0.74477 | 0.791111 | 0.833333 | 0.6 | 0.697674 |
| Average | 0.940059 | 0.934515 | 0.936591 | 0.922129 | 0.922511 | 0.921901 | 0.781019 | 0.731527 | 0.748367 |

As shown in Table 1, an average precision of ~94.0%, and an average recall of ~93.5% are achieved for the six labels using this trained classification deep neural network 72 for a total number of 1,391 test particles 100 that were imaged by the device 10. In Table 1, the classification performance of the mobile device 10 is relatively lower for *Aspergillus* spores compared to other classes. This is due to the fact that (1) *Aspergillus* spores are smaller in size (~4 µm), so their fine features may not be well-revealed under the current imaging system resolution, and (2) the *Aspergillus* spores sometimes cluster and may exhibit a different shape compared to an isolated spore (for which the network 72 was trained for). In addition to these, the background dust images used in this testing are captured along the major roads with traffic. Although it should contain mostly non-biological aerosol particles 100, there is a finite chance that a few bio-aerosol particles 100 may also be present in the data set, leading to mislabeling.

Table 1 also compares the performance of two other classification methods on the same data set, namely AlexNet and support vector machine (SVM). AlexNet, although has more trainable parameters in the network design (because of the larger fully connected layers), performs ~1.8% worse in precision and 1.2% worse in recall compared to the CNN 72 described herein. SVM, although very fast to compute, has significantly worse performance than the CNN models, reaching only 78.1% precision and 73.2% recall on average for the testing set.

FIG. 9 illustrates the operations involved in using the two trained deep neural networks 70, 72 to use a raw hologram image I (or diffraction patterns) captured with the device 10 to classify the particles 100. As seen in operation 200, the device 10 is used to capture a sample hologram image I of the particles 100. The raw captured hologram image I of the particles 100 is then subject to a background correction operation 210 (described in more detail herein) which uses a shade correction algorithm to correct for non-uniform background and related shades using a wavelet transform. Differential imaging is also used to reveal newly captured aerosol particles 100 captured on the optically transparent substrate 34 (e.g., glass slide or cover slip). This produces a corrected differential hologram image I* as seen in operation 220. Next, the hologram image I* is then input into the first trained deep neural network 70 to generate the reconstructed phase image 71$p$ and amplitude image 71$a$ as seen in operation 230. These images are then subject to a particle detection and cropping operation 240 to crop smaller FOV images 71$a_{cropped}$, 71$b_{cropped}$ of the particles 100. These reconstructed images 71$a_{cropped}$, 71$b_{cropped}$ are then input to the second trained deep neural network 72 as seen in operation 250. The second trained deep neural network 72 generates a classification label 110 for each of the particles 100 as seen in operation 260. The example shown in FIG. 9 is that the particular particle 100 is "pollen—oak". Next, the image processing software 66 may optionally output additional data regarding the particles 100 as seen in operation 270. This may include, for example, particles counts and/or particle statistics. FIG. 9 illustrates a histogram H of particle density (count/L) for different particle classes or types. This may be displayed, for example, on the display of the portable electronic device 62 (FIG. 5) or other display associated with a computing device 52.

Bio-Aerosol Mixture Experiments

To further quantify the label-free sensing performance of the device 10, two additional sets of experiments were undertaken—one with a mixture of the three pollens, and another with a mixture of the two mold spores. In addition, in each experiment there were also unavoidably dust particles (background PM) other than the pollens and mold spores that were introduced into the device 10 and were sampled and imaged on the detection substrate 34.

To quantify the performance of the device 10, the sampled sticky substrate 34 in each experiment was also examined (after lens-less imaging) by a microbiologist under a scanning microscope with 40× magnification, where the corresponding FOV that was analyzed by the mobile device 10 was scanned and the captured bio-aerosol particles 100 inside each FOV were manually labeled and counted by a microbiologist (for comparison purposes). The results of this comparison are shown in FIGS. 10A-10F, where FIG. 10A-10D is from four independent pollen mixture experiments and FIG. 10E-10F is from two independent mold spores mixture experiments. The confusion matrix for each sample is also shown in FIGS. 11A-11F.

To further quantify detection accuracy, FIGS. 10G-10L plots the results of FIGS. 10A-10F individually for each of the six classes, where the x-axis is the manual count made by an expert and the y-axis is the automatic count generated by the mobile device 10. In these results, a relatively large overcounting for *Alternaria* and undercounting for *Aspergillus* was observed in FIG. 10E, 10F, as also seen by their larger root mean square error (RMSE). This may be related to the fact that (1) the mold spores are smaller and therefore relatively more challenging to classify using the current resolution of the device 10, and (2) the mold spores tend to coagulate due to moisture, which may confuse the CNN model when they are present in the same ROI (see e.g., FIG. 12). These results might be further improved using per-pixel semantic segmentation instead of performing classification with a fixed window size.

Field Sensing of Oak Tree Pollens

Figures 13A, 13B, 13C:
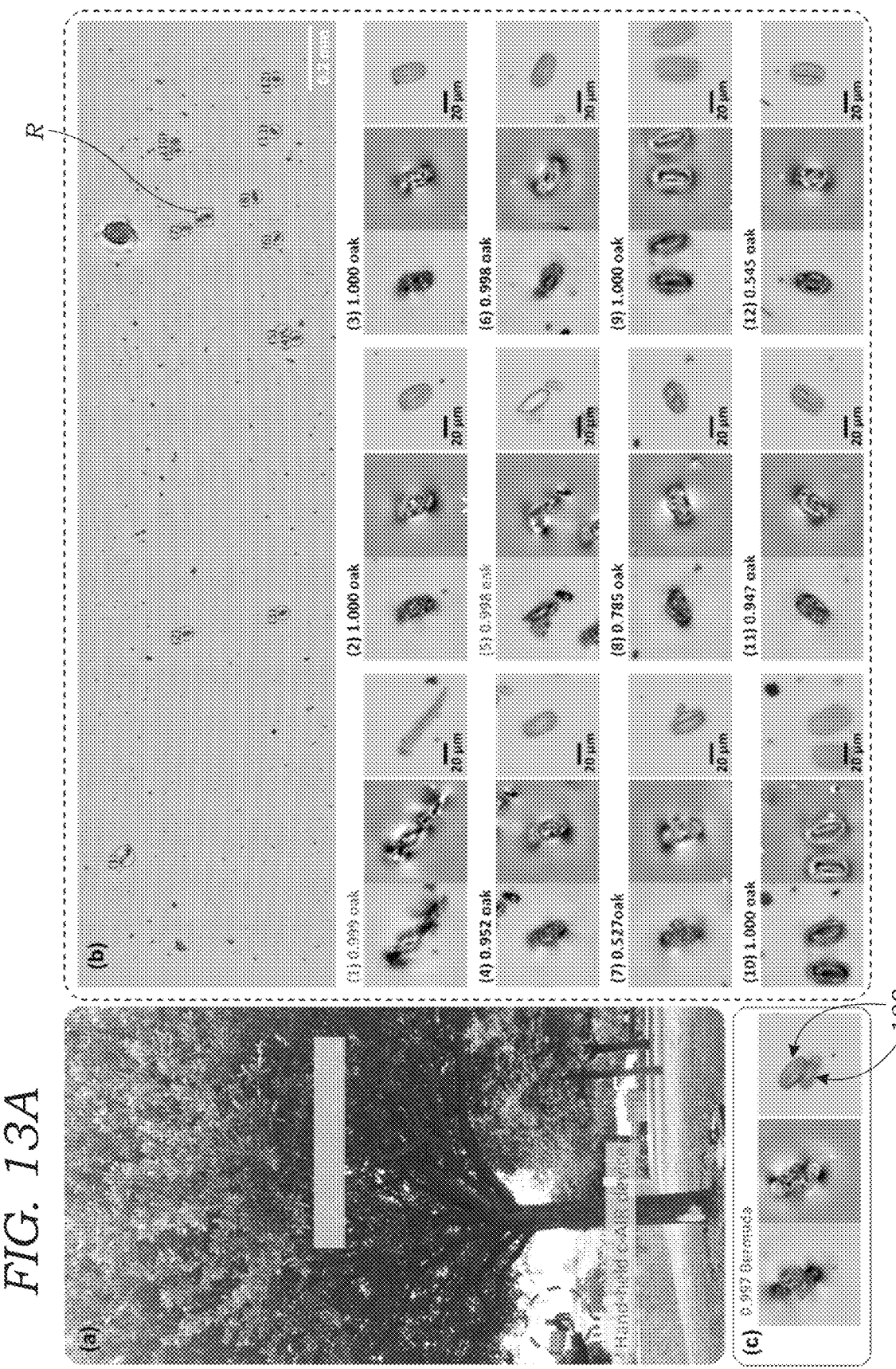
FIG. 13A illustrates an image showing field testing of the mobile bio-aerosol sensing device is performed under a line of four oak trees in Los Angeles (Spring of 2018).
FIG. 13B illustrates a full-FOV reconstruction of the captured aerosol samples, where the oak pollen bio-aerosols that are detected by the deep learning-based classification algorithm are marked by circles. The zoomed-in images of these detected particles, with real (left) and imaginary (right) images, reconstructed also using a deep neural network, are shown in (1)-(12). A comparison image captured later using a benchtop microscope under 40× magnification is also shown for each region. Softmax classification scores for each captured aerosol are also shown on top of each ROI. The two misclassification cases include panels (1) and (5) (0.999 oak and 0.998 oak).
FIG. 13C illustrates that a cluster of oak particles is misclassified as Bermuda pollen. Its location is highlighted by a square R in FIG. 13B.
Figure 14A:
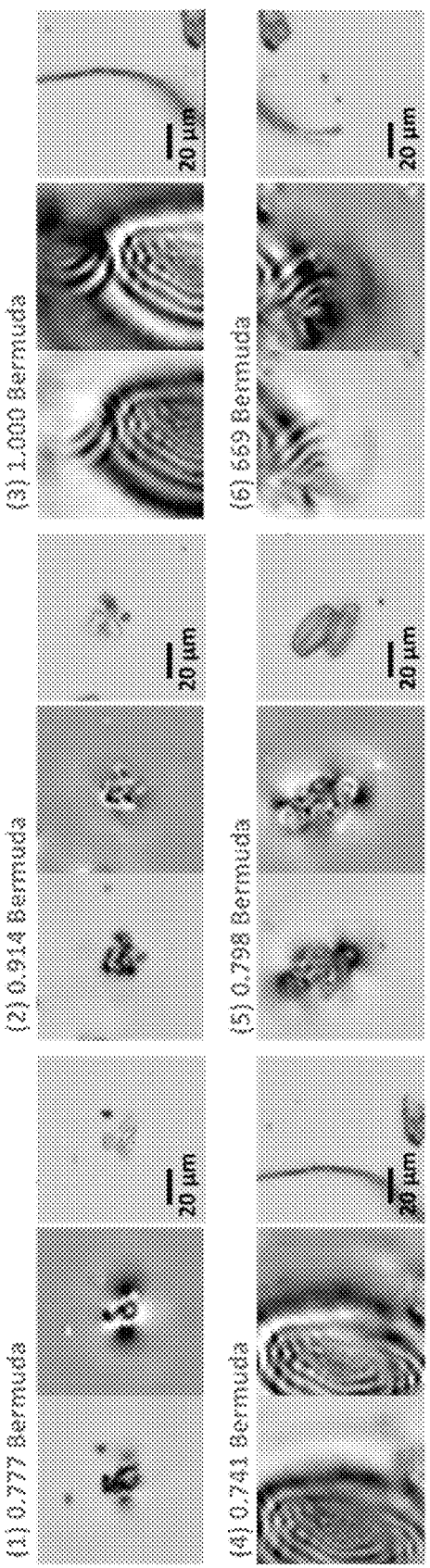
FIGS. 14A and 14B illustrate false positive detections of Bermuda grass and ragweed pollens in the oak tree pollen field testing.
Figure 14B:
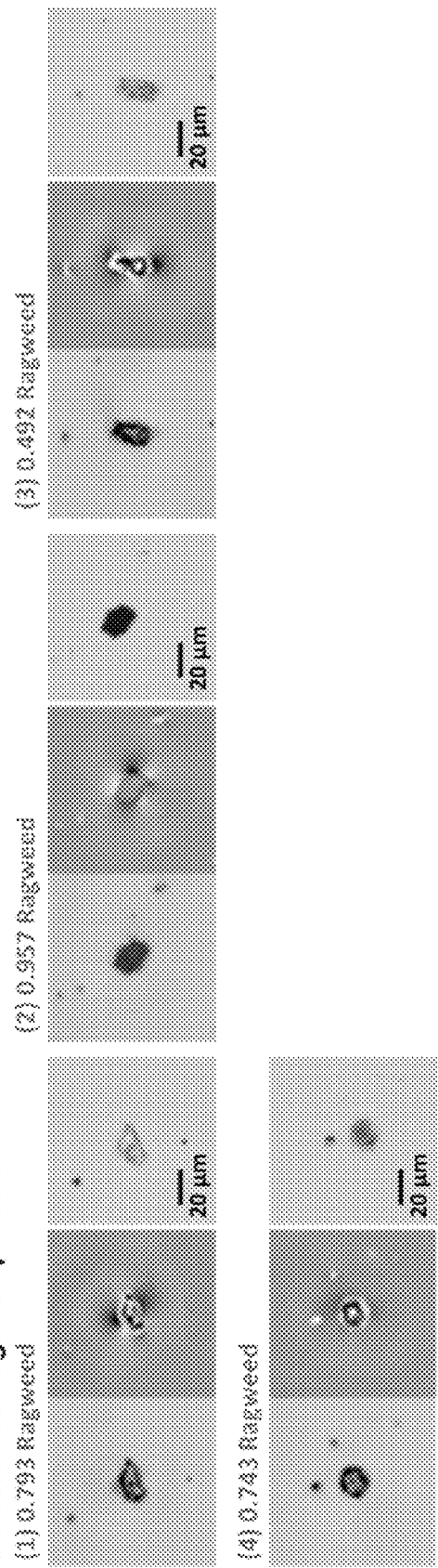

The detection of oak pollens in the field using the mobile device 10. In the Spring of 2018, the device 10 was used to measure bio-aerosol particles 100 in air close to a line of four oak trees (*Quercus Virginiana*) at the University of California, Los Angeles campus. A three-minute air sample is taken close to these trees at a pumping rate of 13 L/min, as illustrated in FIG. 13A. The whole FOV reconstruction of this sample is shown in FIG. 13B, which also highlights different ROIs corresponding to the oak tree pollens automatically detected by the deep learning-based algorithm. In these twelve ROIs, there are two false positive detections (ROIs 1 and 5 in FIG. 13B), which are actually plant fragments that have elongated shapes. Similar mis-classifications of the CNN neural network 72 that classifies plant fragments as pollens also happened for the other two pollens—Bermuda grass and ragweed, as shown in FIGS. 14A (detected as Bermuda pollens) and 14B (detected as Ragweed pollens). This problem can be addressed by including such plant fragment images in the training dataset as an additional label for the classification neural network 72 (e.g., classification label 110 of "plant fragment" or the like).

The entire FOV was also evaluated to screen for the false negative detections of oak tree pollen particles 100. Of all the detected bio-aerosol particles 100, it was seen that the CNN neural network 72 missed one cluster of oak tree pollens 100 within the FOV, as marked by a rectangle R in FIG. 13B and shown in FIG. 13C, which is classified as Bermuda with a high score. From FIG. 13C, once can see that this image contains two oak tree pollen particles 100 clustered together, and since the training dataset only included isolated oak tree pollens it was misclassified as a Bermuda grass pollen, which is generally larger in size and rounder in shape than an oak tree pollen (providing a better fit to a cluster of oak pollens). Although the occurrence of clustered pollens is relatively rare, these types of misclassifications can be reduced by including clusters of pollen examples in the training dataset, or using per-pixel semantic segmentation instead of a classification CNN.

The mobile bio-aerosol sensing device 10 is hand-held, cost-effective and accurate. It can be used to build a wide-coverage automated bio-aerosol monitoring network in a cost-effective and scalable manner, which can rapidly provide accurate response for spatio-temporal mapping of bio-aerosol particle 100 concentrations. The device 10 may be controlled wirelessly and can potentially be carried by unmanned vehicles such as drones to access bio-aerosol monitoring sites that may be dangerous for human inspectors.

Methods

Computational-Imaging-Based Bio-Aerosol Monitoring

To perform label-free sensing of bio-aerosol particles 100, a computational air quality monitor based on lens-less microscopy was developed. FIGS. 1-5 shows its design schematics. It contains a miniaturized vacuum pump 14 (M00198, GTEK Automation) that takes in air through a disposable impactor (Air-O-Cell Sampling Cassette, Zefon International, Inc.) at 13 L/min. The impactor uses a sticky polymer 35 coverslip as the substrate 34 right below the impactor nozzle 30 with a spacing of ~800 μm between them. Because of their larger momentum, aerosols and bio-aerosols 100 within the input air stream cannot follow the output air path, so they hit on and are collected by the sticky coverslip 34 of the impactor. An infrared vertical-cavity surface-emitting laser (VCSEL) diode (OPV300, TT Electronics, $\lambda_p$=850 nm) was used as the illumination source 40 and illuminates the collected aerosols 100 from above, casting an in-line hologram of the aerosol particles 100, which is recorded by a complementary metal-oxide-semiconductor (CMOS) image sensor 24 chip (Sony IMX219PQ, pixel pitch 1.12 μm). These in-line holograms are sent to a remote server (e.g., a local PC) 52 where the aerosol images I are analyzed automatically. To avoid secondary light sources from the reflection and refraction of the transparent impactor nozzle 30, a 3D-printed black cover is used to tightly cover the impactor surface.

Figure 15A:
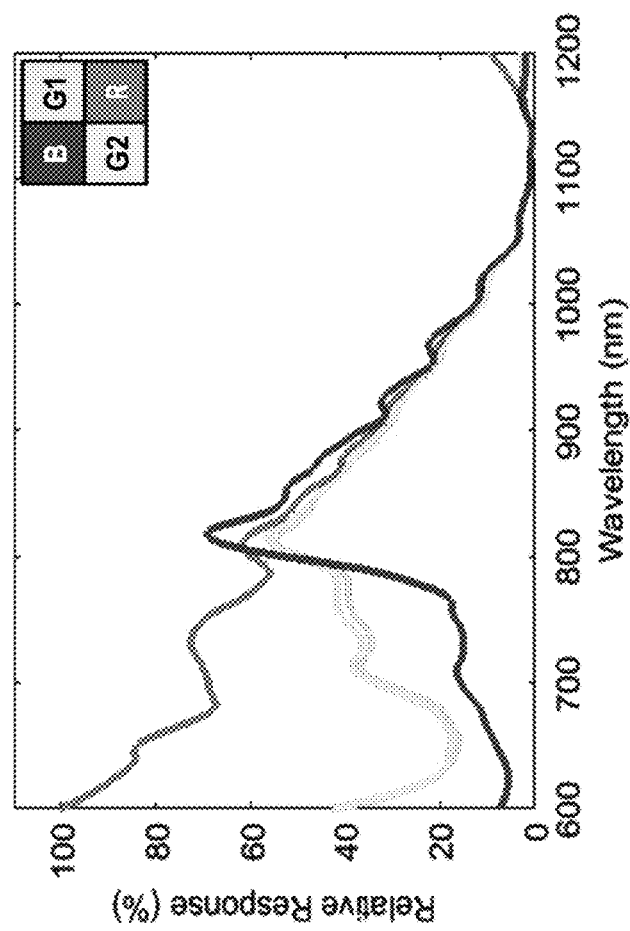
FIGS. 15A and 15B illustrate the sensor response of Sony IMX219PQ image sensor.
Figure 15B:
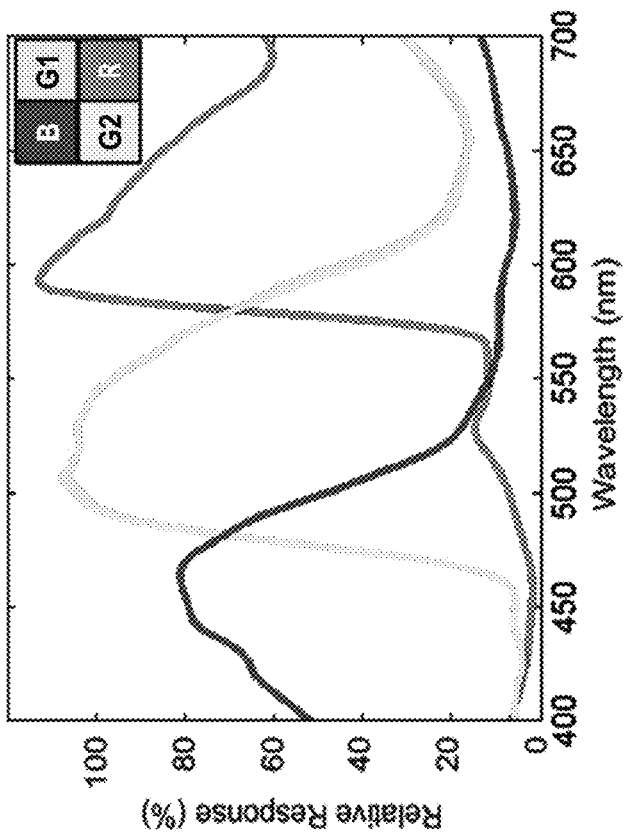

A driver chip (TLC5941NT, Texas Instruments) controls the current of the illumination VCSEL 40 at its threshold (3 mA), which provides adequate coherence without introducing speckle noise. 850 nm illumination wavelength is specifically chosen to use all of the four Bayer channels on the color CMOS image sensor 24, since all the four Bayer channels have equal transmission at this wavelength, making it function like a monochrome sensor for holographic imaging purposes (see FIGS. 15A and 15B). Benefited from this, as well as higher coherence of the laser diode, a better spatial resolution is achieved. The entire mobile device 10 is powered by a Lithium polymer (Li-po) battery 54 (Turnigy Nano-tech 1000 mAh 4S 45~90 C Li-po pack) and controlled by an embedded single board computer (Raspberry Pi Zero W) containing processor 50.

Figure 7B:
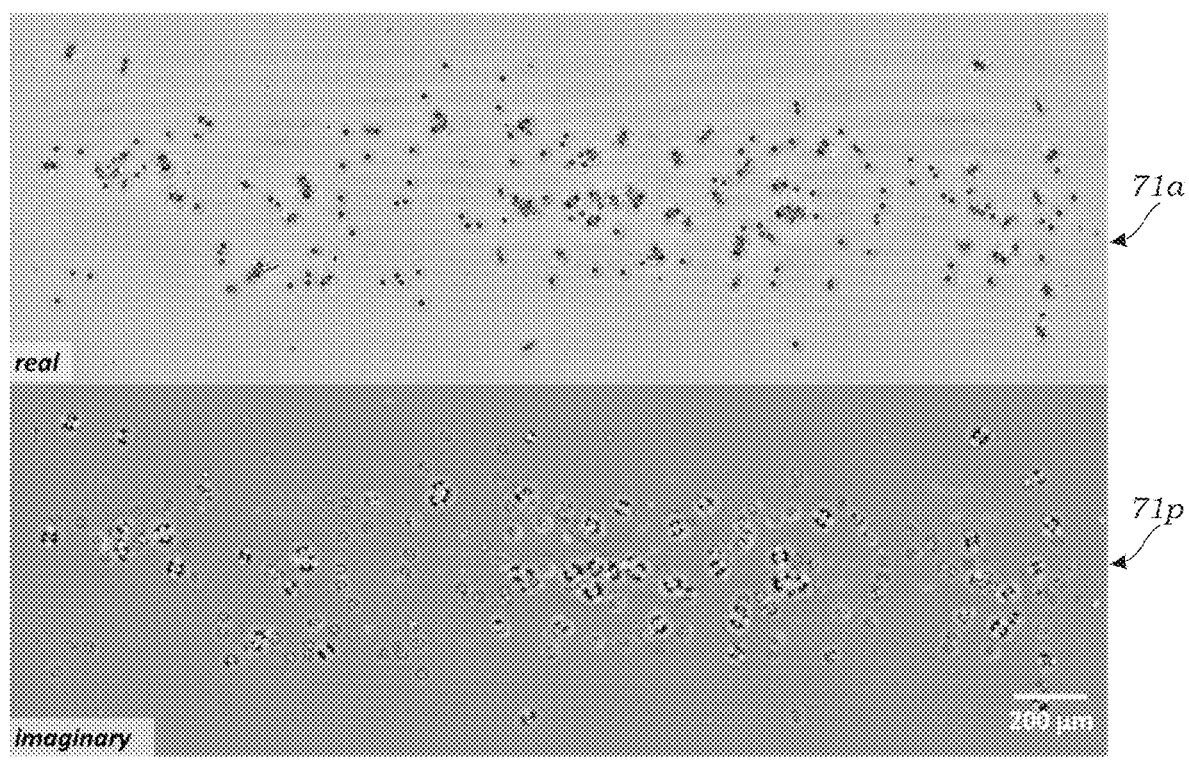
FIG. 7B illustrates the real and imaginary channels of the extended depth-of-field holographic image generated using a trained deep convolutional neural network.

Simultaneous Autofocusing and Phase Recovery of Bio-Aerosols Using Deep Learning To simultaneously perform digital autofocusing and phase recovery for each individual aerosol particle 100, a CNN-based trained deep neural network 70 was used, built using Tensorflow. This CNN-network 70 is trained with pairs of defocused back-propagated holograms and their corresponding in-focus, phase recovered images (ground truth, GT images). These phase-recovered GT images are generated using a multi-height phase recovery algorithm using eight hologram measurements at different sample-to-sensor distances. After its training, the CNN-based trained deep neural network 70 can perform autofocusing and phase recovery for each individual aerosol particle 100 in the imaging FOV, all in parallel (up to a defocus distance of ±100 μm), and rapidly generates a phase-recovered, extended DOF reconstruction of the image FOV (FIG. 7B). Due to limited graphical memory of the computer 52, the full FOV back-propagated image (9840×3069×2) cannot be processed directly; it is therefore divided into 12-by-5 patches of 1024-by-1024 pixels with a spatial overlap of 100-pixels between images. Each individual patch is processed in sequence and the results are combined after this reconstruction step to reveal the bio-aerosol distribution captured within the entire FOV. Each patch takes ~0.4 s to process, totaling ~25 s for the entire FOV.

Aerosol Detection Algorithm

A multi-scale spot detection algorithm similar to that disclosed in Olivo-Marin, et al., Extraction of Spots in Biological Images Using Multiscale Products, Pattern Recognition 2002, 35, 1989-1996 (incorporated by reference herein) was used to detect and extract each aerosol ROI. This algorithm takes six levels of high pass filtering of the complex amplitude image per ROI, obtained by the difference of the original image and the blurred images filtered by six different kernels. These high-passed images are per-pixel multiplied with each other to obtain a correlation image. A binary mask is then obtained by thresholding this correlation image with three-times the standard deviation added to the mean of the correlation image. This binary mask is dilated by 11 pixels, and the connected components are used to estimate a circle with the centroid and radius of each one of the detected spots, which marks the location and rough size of each detected bio-aerosol. To avoid multiple detections of the same aerosol, a non-maximum suppression criterion is applied, where if an estimated circle has more than 10% of overlapping area with another circle, only the bigger one is considered/counted. The resulting centroids are cropped into 256×256 pixel ROIs ($71a_{cropped}$, $71b_{cropped}$), which are then fed into the bio-aerosol classification CNN 72. This second trained neural network algorithm takes <5 s for the whole FOV, and achieves better performance compared to conventional circle detection algorithms such as circular Hough transform, achieving 98.4% detection precision and 92.5% detection recall, as detailed in FIG. 16B.

Deep Learning-Based Classification of Bio-Aerosols

The classification CNN architecture of the second trained deep neural network 72 is shown in the zoomed-in part of FIG. 9, which is inspired by ResNet. The network contains five residual blocks, where each block maps the input tensor $x_k$ into output tensor $x_{k+1}$, for a given block k (k=1, 2, 3, 4, 5), i.e., $$x'_k = x_k + \text{ReLU}[\text{CONV}_{k_1}\{\text{ReLU}[\text{CONV}_{k_1}\{x_k\}]\}] \quad (4)$$

$$x_{k+1} = \text{MAX}(x'_k + \text{ReLU}[\text{CONV}_{k_2}\{\text{ReLU}[\text{CONV}_{k_1}\{x'_k\}]\}]) \quad (5)$$

where ReLU stands for rectified linear unit operation, CONV stands for the convolution operator (including the bias terms), and MAX stands for the max-pooling operator. The subscript $k_1$ and $k_2$ denote the number of channels in the corresponding convolution layer, where $k_1$ equals to the number of input channels and $k_2$ expands the number of channels twice, i.e. $k_1$=16, 32, 64, 128, 256 and $k_2$=32, 64, 128, 256, 512 for each residual block (k=1, 2, 3, 4, 5). Zero padding is used on the tensor $x'_k$ to compensate the mismatch between the number of input and output channels. All the convolutional layers use a convolutional kernel of 3×3 pixels, a stride of one pixel, and a replicate-padding of one pixel. All the max-pooling layers use a kernel of two pixels, and a stride of two pixels, which reduces the width and height of the image by half.

Following the residual blocks, an average pooling layer reduces the width and height of the tensor to one, which is followed by a fully-connected (FC) layer of size 512×512. Dropout with 0.5 probability is used on this FC layer to increase performance and prevent overfitting. Another fully connected layer of size 512×6 maps the 512 channels to 6 class scores (output labels) for final determination of the class of each bio-aerosol particle 100 that is imaged by the device 10. Of course, additional classes beyond these six (6) may be used.

During training, the network minimizes the soft-max cross-entropy loss between the true label and the output scores:

$$L = \sum_i \left[ -\log\left( \frac{e^{f_{y_i}(x_i)}}{\sum_j e^{f_j(x_i)}} \right) \right] \quad (6)$$

where $f_j(x_i)$ is the class score for the class j given input data $x_i$, and $y_i$ is the corresponding true class for $x_i$. The dataset contains ~1,500 individual 256×256 pixel ROIs for each of the six classes, totaling ~10,000 images. 70% of the data for each class is randomly selected for training, and remaining images are equally divided to validation and testing sets. The training takes ~2 h for 200 epochs. The best trained model is selected to be the one that gives lowest soft-max loss for the validation set within 200 training epochs. The testing takes <0.02 s for each 256×256 pixel ROI. For a typical FOV with e.g., ~500 particles, this step is completed in ~10 s.

Shade Correction and Differential Holographic Imaging

A shade correction algorithm is used to correct the non-uniform illumination background and related shades observed in the acquired holograms. For each of the four Bayer channels, the custom-designed algorithm performs a wavelet transform (using order-eight symlet) on each holographic image, extracts the sixth level approximation as background shade, and divides the holographic image with this background shade to correct for non-uniform background-induced shade, balancing the four Bayer channels, and centering the background at one. For each air sample, two holograms are taken (before and after sampling the captured aerosols) to perform differential imaging, where this difference hologram only reveals the newly captured aerosols on the sticky coverslip. Running on Matlab 2018a using GPU-based processing, this part is completed in <1 s for the entire image FOV.

Digital Holographic Reconstruction of Differential Holograms

The complex-valued bio-aerosol images o(x, y) (containing both amplitude and phase information) are reconstructed from their differential holograms I(x, y) using free-space digital backpropagation, i.e., $$\text{ASP}[I(x,y);\lambda,n,-z_2] = 1 + o(x,y) + t(x,y) + s(x,y) \quad (7)$$

where $\lambda$=850 nm is the illumination wavelength, n=1.5 is the refractive index of the medium between the sample and the image sensor planes, and $z_2$=750 μm is the approximate distance between the sample and image sensor. ASP[·] operator is the angular spectrum based free-space propagation, which can be calculated by the spatial Fourier transform of the input signal using a fast Fourier transform (FFT) and then multiplying it by the angular spectrum filter $H(v_x, v_y)$ (defined over the spatial frequency variables, $v_x$, $v_y$), i.e., $$H(v_x, v_y; \lambda, n, z_2) = \quad (8)$$

$$\begin{cases} \exp\left[-j2\pi \cdot \frac{nz_2}{\lambda} \cdot \sqrt{1 - \left(\frac{\lambda}{n}v_x\right)^2 - \left(\frac{\lambda}{n}v_y\right)^2}\right], & \text{if } v_x^2 + v_y^2 \leq \left(\frac{n}{\lambda}\right)^2 \\ 0, & \text{otherwise} \end{cases}$$

which is then followed by an inverse Fourier transform. In equation (7), direct back-propagation of the hologram intensity yields two additional noise terms: twin image t(x, y) and self-interference noise s(x, y). To give a clean reconstruction, free from such artifacts, these terms can be removed using phase recovery methods. In the reconstruction process, the exact axial distance between the sample and the sensor planes for the measurements may differ from 750 μm due to e.g., the unevenness of the sampling substrate or simply due to mechanical repeatability problems in the cost-effective mobile device 10. Therefore, some particles 100 might appear out-of-focus after this propagation step. Such potential problems are solved simultaneously using a CNN based reconstruction that is trained using out-of-focus holograms spanning; as a result, each bio-aerosol particle 100 is locally autofocused, and phase-recovered in parallel.

Comparison of Deep Learning Classification Results Against SVM and AlexNet

The classification precision and recall of the convolutional neural network (CNN) based bio-aerosol sensing method is compared against two other existing classification algorithms, i.e. support vector machine (SVM) and AlexNet. The results are shown in Table 1. The SVM algorithm takes the (vectorized) raw complex pixels directly as input features, using a linear classifier with Gaussian kernel. The AlexNet uses only two channels, i.e., the real and imaginary parts of the holographic image (instead of RGB channels).

Both the SVM and AlexNet are trained and tested on the same training, validation, and testing sets, matching the CNN 72 described herein, also using a similar number of epochs (~200).

Spot Detection Algorithm for Bio-Aerosol Localization

Figure 16A:
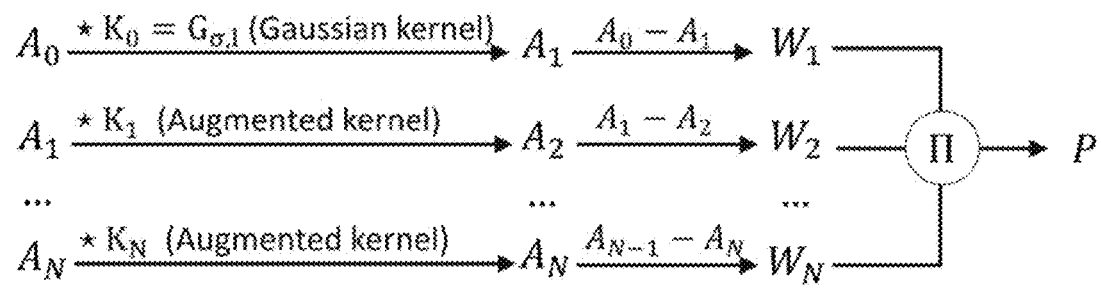
FIG. 16A illustrates the algorithm workflow for bio-aerosol localization using a spot-detection algorithm.

To crop individual aerosol regions for CNN classification, a spot detection algorithm is used to detect locations of each aerosol in the reconstructed image. As summarized in FIG. 16A, a Gaussian filter $G_{o,l}$ with variance $\sigma^2$ and kernel size l is applied to the reconstructed complex amplitude $A_0$, and a smoothed image $A_1$ is generated. Then a series of augmented kernels are generated through sequentially up-sampling the original Gaussian kernel by 2-fold in each case:

$$K_i = \uparrow_2 [K_{i-1}], i=1, 2, \ldots, N \quad (9)$$

where the initial filter $K_0 = G_{o,l}$ is the original Gaussian kernel. The augmented kernels ($K_i$) are used to filter the input image N times at different levels, i=1, 2, ..., N, giving a sequence of smoothed images $A_i$. The difference of $A_{i-1}$ and $A_i$ is computed as $W_i = A_{i-1} - A_i$. shrinkage operation is applied subsequently on each $W_i$ to alleviate noise, i.e.:

$$W'_1(x, y) = \begin{cases} W_i(x, y) - 3\sigma(W_i), & W_i(x, y) > 3\sigma(W_i) \\ 0, & \text{otherwise} \end{cases} \quad (10)$$

where $\sigma(W_i)$ is the standard deviation of $W_i$. Then, a correlation image P is computed as the element-wise product of $W'_i$ (i=1, 2, . . . N), i.e., $P = \Pi_{i=1}^{N} W'_i$. A threshold operation, followed by a morphological dilation of 11 pixels is applied on this correlation image, which results in a binary mask. The centroid and area are calculated for each connected component in this binary mask, which represent the centroids and radii of the detected aerosols. If there are two detected regions with more than 10% of overlapping area (calculated from their centroid and radii), a non-maximum suppression strategy is used to eliminate the one with the smaller radius, to avoid multiple detections of the same aerosol.

Figures 16B, 16C:
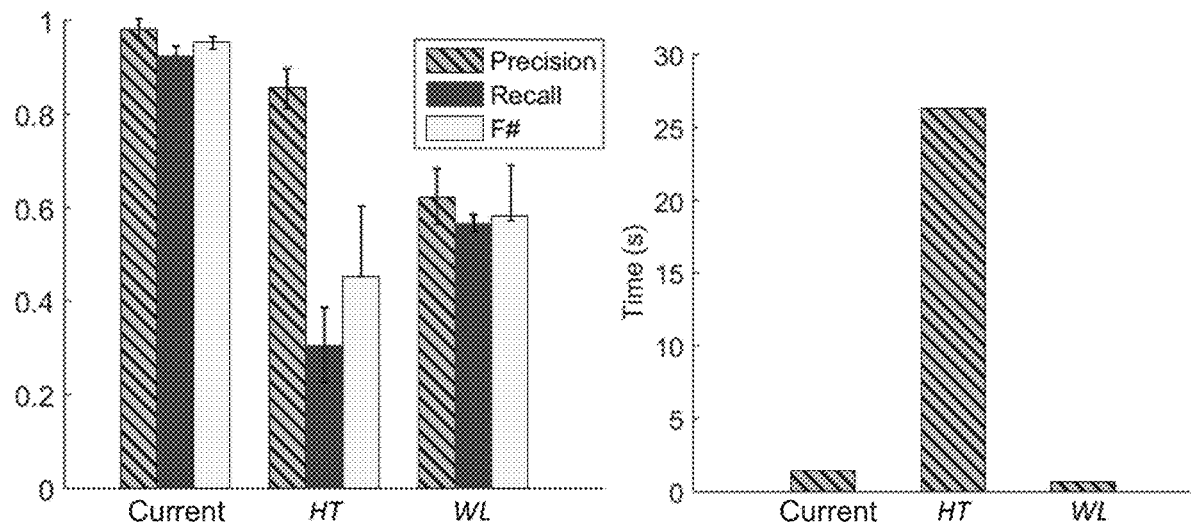
FIG. 16B illustrates a graph showing the precision and recall of the spot-detection algorithm, compared against two other algorithms, i.e., the circular Hough transform (HT) and wavelet-based detection (WL). Four Regions are manually selected and analyzed to calculate precision, recall and F #.
FIG. 16C illustrates the processing times are reported for the detection of the aerosols within a FOV of 3480×1024 pixels using these three algorithms (of FIG. 16B).

FIG. 16B illustrates the precision, recall and detection speed of this algorithm, compared against circular Hough Transform (HT) and a wavelet-based spot detection algorithm (WL). Four manually counted field-of-views (FOVs) are used in this comparison. Using this spot detection algorithm, a 98.4% detection precision and 92.5% recall are achieved for localizing each individual bio-aerosol, which is significantly better than the other two algorithms that were used for comparison. For processing the entire FOV, the algorithm used herein takes 1.45 s, which is similar to the wavelet-based algorithm performance (0.69 s), and much faster than the circular Hough transform (26.3 s) (FIG. 16C). The speed can be further improved by transferring the algorithm to a different programming environment from Matlab.

Bio-Aerosol Sampling Experiments in the Lab

Figure 17A:
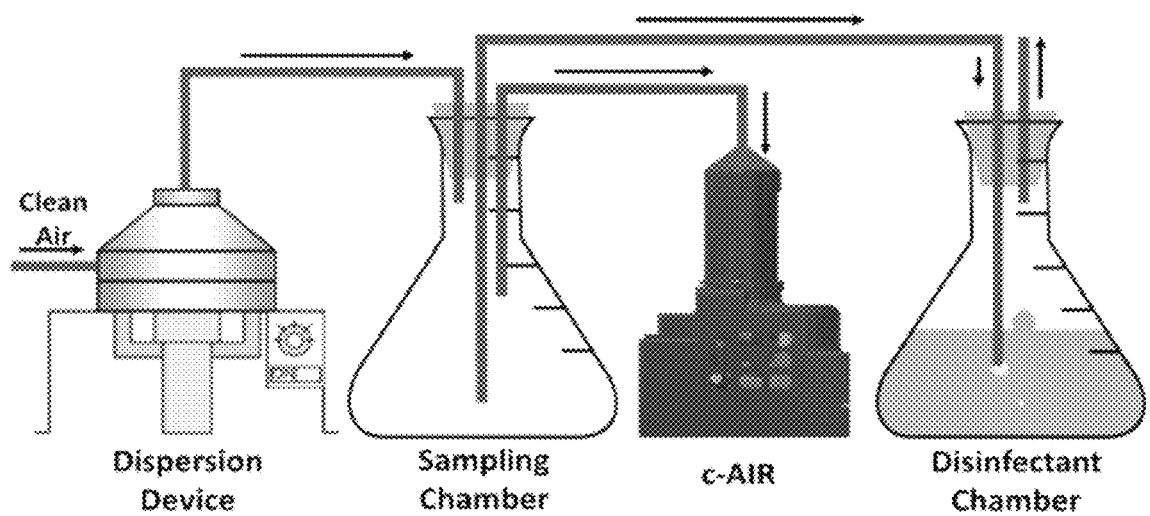
FIG. 17A illustrates a schematic of the bio-aerosol sampling experimental set-up used for experiments conducted herein.
Figure 17B:
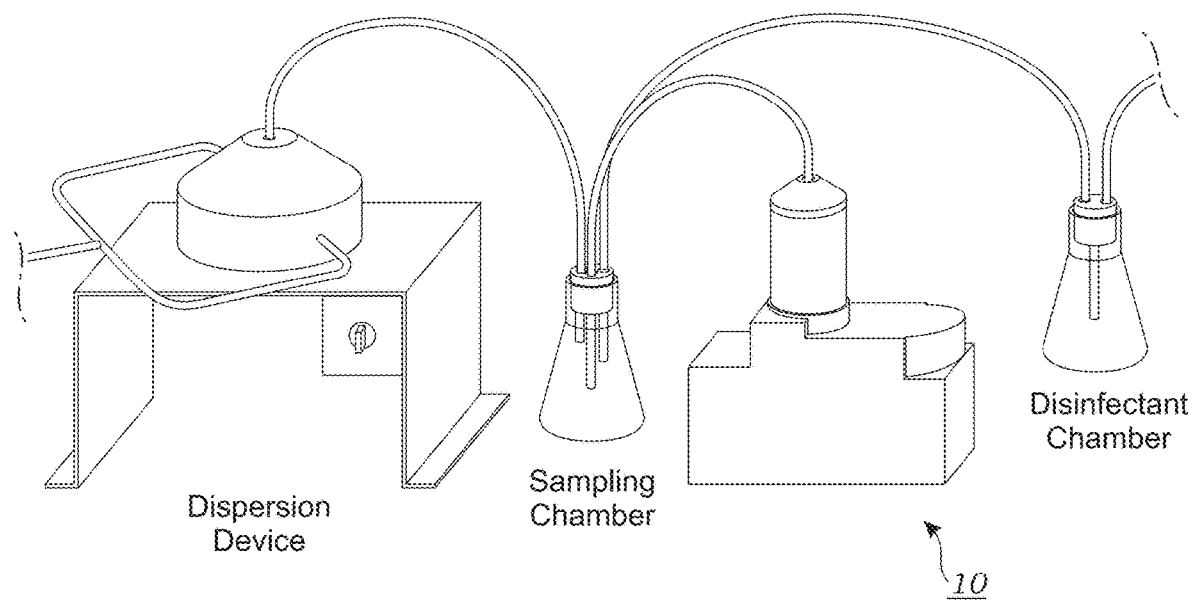
FIG. 17B is a line drawing of the device used in the air sampling experiment.

The pollen and mold spore aerosolization and sampling experimental setup is shown in FIGS. 17A and 17B. A customized particle dispersion device (disperser) is built following the design detailed in Fischer, G. et al., Analysis of Airborne Microorganisms, MVOC and Odour in the Surrounding of Composting Facilities and Implications for Future Investigations. International Journal of Hygiene and Environmental Health 2008, 211, 132-142 (incorporated by reference herein). This disperser contains a rotating plate inside an air-tight chamber, which is connected to a motor that rotates the plate at 3 revolutions per minute. The inlet of disperser chamber is connected to clean air, which aerosolizes the particles inside the disperser chamber. The particles then enter the sampling chamber through a tube (made of a beaker). The mobile bio-aerosol sensing device 10 connects to the sampling chamber through a tube and samples the aerosols inside it at 13 L/min. The sample chamber is also connected to another disinfectant chamber containing 20% bleach solution, which balances the pressure in the system and sterilizes the output air. The whole experiment setup is placed inside a fume hood within a bio-safety level-2 lab.

For the sampling of mold spores, the cultured mold agar substrate is placed on a petri dish inside the aerosolization chamber and the inlet clean air blows the spores from the agar plate through the sampling system. For pollen experiments, the dried pollens are poured into a clean petri dish, which are also placed inside the aerosolization chamber.

Bio-Aerosol Sample Preparation

Natural dried pollens: ragweed pollen (*Artemisia artemisiifolia*), Bermuda grass pollen (*Cynodon dactylon*), oak tree pollen (*Quercus agrifolia*) used in the experiments described herein were purchased from Stallergenes Greer, (NC, USA) (cat no: 56, 2 and 195, respectively). Mold species *Aspergillus niger*, *Aspergillus sydoneii* and *Alternaria* sp. were provided and identified by Aerobiology Laboratory Associates, Inc. (CA, USA). Mold species were cultivated on Potato Dextrose Agar (cat no: 213300, BD™—Difco, NJ, USA) and Difco Yeast Mold Agar (cat no: 271210 BD™—Difco, NJ, USA). Agar plates were prepared according to the manufacturer's instructions. Molds were inoculated and incubated at 35° C. for up to 4 weeks for growth. Sporulation was initiated by UV light spanning from 310-400 nm (Spectronics Corporation, Spectroline™, NY, USA) with a cycle of 12 hours dark and 12 hours light. Background dust samples were acquired by the mobile device 10 in outdoor environment along major roads in Los Angeles, Calif.

Using Deep Learning in Label-Free Bio-Aerosol Sensing

Previously, a similar holographic microscopy hardware setup was used to detect particulate matter (PM), and used a linear regression model to infer the particle size, without any classification capability. U.S. Patent Application Publication No. 2020/0103328 discloses such as system, which is incorporated herein by reference. Different from the previous work, here a rapid, automated and label-free sensing of bio-aerosol particles 100 is disclosed, which is a much more challenging task. Label-free sensing of bio-aerosol particles 100, especially using a portable and low-cost device, has various applications, but remains as an unmet challenge. Current technologies either rely on some manual post-processing of bio-aerosols captured in the field or do not have sufficient specificity towards classification labels. Moreover, all of them require complicated and costly equipment.

To perform highly-accurate label-free detection of bio-aerosol particles 100, two deep convolutional neural networks (CNNs) 70, 72 have been developed and successfully implemented. The first CNN 70 reconstructs the microscopic images of bio-aerosol particles 100 from in-line holograms with simultaneous auto-focusing and phase recovery capability. The second CNN 72 performs classification of the captured bio-aerosol particles 100 and achieved a >94% classification accuracy in experiments. In comparison, a support vector machine-based classification achieved only 78.1% precision and 73.2% recall on the same image dataset (see Table 1), which clearly illustrates the importance of using a deep CNN.

Comparison of Current System to Earlier Learning-Based Bio-Aerosol Detection Methods Some of the earlier bio-aerosol detection systems used the auto-fluorescence signal of bio-aerosols flowing through a tapered air channel. Several machine-learning algorithms, including clustering, decision trees, support vector machines, boosting, and fully connected neural networks have been investigated for classification of bio-aerosols using auto-fluorescence information (and scattering information in some cases). However, compared to these earlier methods, the current approach has several major advantages.

First, measuring auto-fluorescence (and/or scattering) of bio-aerosols 100 gives only indirect and limited information on the morphology of bio-aerosols 100. In comparison, the method described herein uses lens-less digital holographic microscopy and deep-learning to reconstruct detailed microscopic images of bio-aerosol particles 100, with sub-micron spatial resolution. These reconstructed images 71a, 71p include detailed morphological information (in phase and amplitude channels) provides a direct measure of the captured bio-aerosols 100, and is very useful for highly-accurate and automated classification of bio-aerosols 100. It also provides microscopic images of all the captured particles 100 for experts to manually analyze the samples, if for example an unknown bio-aerosol is encountered.

Second, compared to conventional machine learning tools employed in these previous publications, the current method uses, in a preferred embodiment, two trained deep neural networks 70, 72 (CNNs—a first trained deep neural network 70 for reconstructing phase and amplitude images 71p, 71a of the captured bio-aerosol particles 100 and a second trained deep neural network 72 for automatic classification of the particles 100 in the reconstructed images). Deep CNNs typically perform much better than conventional machine learning algorithms in image classification; due to parameter sharing, a CNN uses less trainable parameters than e.g., a fully connected network of the same size, and thus is less likely to overfit to the training data. Also, as the network gets deeper, the CNN performance improves significantly. Moreover, due to the convolutional nature of a CNN, it is more robust to detect objects of interest regardless of their relative displacements within the reconstructed image.

Third, some of these devices use a tapered air channel, where the particles flow through a tapered nozzle and are analyzed individually (i.e., one by one). This serial readout design limits the sampling rate to ~1.5 L/min. Accurate measurements of either too high or too low concentrations of aerosols are challenging for such designs. In comparison, the device 10 capture a single wide field-of-view hologram, where hundreds of bio-aerosol particles 100 can be reconstructed and rapidly analyzed, in parallel. Therefore, the current device 10 reaches a high sampling rate of 13 L/min and can account for a larger dynamic range of aerosol concentrations.

Lastly, earlier designs that are based on auto-fluorescence require strong UV or pulsed laser sources, sensitive photodetectors, and high-performance optical components, which make the system relatively costly and bulky. In contrast, the device 10 described herein only uses a partially coherent light source 40 (e.g., a laser diode) and an image sensor 24, which requires minimal alignment. Thus, the device 10 is quite inexpensive (<$200 in its current low volume production), and light-weight (<600 g). The portability of the device 10 is very favorable in field testing applications.

Image Acquisition and Data Processing Time

The mobile bio-aerosol detection device 10 samples air at 13 L/min and screens bio-aerosols 100 captured on a transparent impactor substrate 34. Typically, 1-3 min of sampling is used to aggregate a statistically significant number of bio-aerosols 100 on the substrate 34, and holographic images are recorded immediately before and after this sampling. Currently, the image data are saved to and transferred from a USB drive that is attached to the device 10. However, the device 10 can also be programmed to connect directly to a remote server or other computing device 52 (e.g., a local PC) to transfer data wirelessly. It was found that during the impaction-based sampling, a large pollen particle 100 occasionally deforms the sticky substrate when it impacts, which acts as a deformed lens and distorts the reconstructed image of the pollen 100. This deformation on the polymer capture surface automatically heals itself after 8-10 min after impaction. To keep the results to be consistent, the holographic images in pollen-related experiments and field tests were captured 15 min after sampling. By using a customized stiffer sampling substrate, and/or using a different sampling strategy other than impaction this passive wait time can be eliminated or reduced significantly.

The image processing workflow, as shown in FIG. 9, typically takes less a minute for the entire imaging FOV, which is by and large spent on the hologram reconstruction (~30 s), the detection of each individual bio-aerosol particle 100 location (~5 s), and the classification of all the bio-aerosols 100 that are detected (~10 s). All the algorithms are running on a PC with a six-core 3.60 GHz CPU, 16 GB of RAM, and Nvidia GeForce GTX 1080Ti GPU, running Matlab 2018a and TensorFlow 1.7.

Automated label-free sensing and classification of bio-aerosols 100 was demonstrated using a portable and cost-effective device 10, which is enabled by computational microscopy and deep-learning. Greater than 94% accuracy in automated classification of six different types of aerosols was achieved, which were selected since they are some of the most common bio-aerosol types and allergens, having a significant impact on human health.

In the experiments conducted herein, the locations of individual bio-aerosols 100 that are captured by the device 10 are extracted in a local image with a fixed window size for deep learning-based classification. This approach, while powerful in general, can also cause some classification problems when there is a bio-aerosol 100 larger than the selected window size, or when more than one type of bio-aerosol particle 100 falls into the same window (coming physically close to each other), as illustrated in FIG. 13C. Using a different machine-learning approach that e.g., uses a varying window size, or per-pixel semantic segmentation may give better performance, especially for densely populated FOVs containing many particles/bio-aerosols 100.

The mobile bio-aerosol sensing device 10 is based on a quantitative phase imaging approach that uses digital holography at its core. Compared to incoherent light microscopy, digital holography also records the phase information of the sample in addition to its amplitude, and this phase information is extremely useful especially for weakly-scattering objects, providing better contrast through the phase channel for such objects. To make better use of this additional phase information is reconstructed for each bio-aerosol particle 100, increasing the spatial resolution of the mobile device 10 using e.g., an array of illumination light sources 40 to achieve pixel super resolution could be an option; alternatively one can also introduce additional illumination wavelengths in the device 10 that can improve resolution and also provide additional spatial features at different parts of the optical spectrum, which might be especially useful for the classification network 72 to recognize different bio-aerosol types based on their absorption and refractive properties. Lastly, one embodiment of the device 10 relies on a disposable cartridge, which requires periodic replacement. Although this cartridge can be quickly replaced within a few seconds, the device 10 design can be further improved using a different particle sampling strategy other than impaction.

While embodiments of the present invention have been shown and described, various modifications may be made without departing from the scope of the present invention. The invention, therefore, should not be limited except to the following claims and their equivalents.

What is claimed is:

1. A method of classifying aerosol particles using a portable microscope device comprising:

capturing aerosol particles on an optically transparent substrate;

illuminating the optically transparent substrate containing the captured aerosol particles with one or more illumination sources contained in the portable microscope device;

capturing holographic images or diffraction patterns of the captured aerosol particles with an image sensor disposed in the portable microscope device and disposed adjacent to the optically transparent substrate;

processing the image files containing the holographic images or diffraction patterns with image processing software contained on a local or remote computing device, wherein image processing comprises inputting the holographic images or diffraction patterns through a first trained deep neural network of the image processing software to output reconstructed amplitude and phase images of each aerosol particle at the one or more illumination wavelengths and wherein a second trained deep neural network of the image processing software receives as an input the outputted reconstructed amplitude and phase images of each aerosol particle at the one or more illumination wavelengths and outputs one or more of the following for each aerosol particle: a classification or label of the type of aerosol particle, a classification or label of the species of the aerosol particle, a size of the aerosol particle, a shape of the aerosol particle, a thickness of the aerosol particle, and a spatial feature of the particle.

2. The method of claim 1, wherein capturing aerosol particles comprises activating a vacuum pump disposed in the portable microscope device.

3. The method of claim 1, wherein the image files containing the holographic images or diffraction patterns are transferred from the portable microscope device to a remote computing device containing the image processing software.

4. The method of claim 1, wherein the image files containing the holographic images or diffraction patterns are processed using a computing device that is integrated within the portable microscope device.

5. The method of claim 1, wherein the image files containing the holographic images or diffraction patterns are processed using a computing device that is locally connected to the portable microscope device.

6. The method of claim 5, wherein the computing device is locally connected to the portable microscope device via a wireless or wired connection.

7. The method of claim 1, wherein the aerosol particles comprise bio-aerosol particles.

8. The method of claim 1, wherein the one or more illumination sources comprises a one or more laser diodes and/or one or more light emitting diodes (LEDs).

9. The method of claim 1, wherein the input to the second trained deep neural network comprises cropped images of the reconstructed amplitude and phase images of each aerosol particle at the one or more illumination wavelengths.

10. A system for classifying aerosol particles comprising:

a portable, lens-free microscopy device for monitoring air quality comprising:

a housing;

a vacuum pump configured to draw air into an impaction nozzle disposed in the housing, the impaction nozzle having an output located adjacent to an optically transparent substrate for collecting particles contained in the air;

one or more illumination sources disposed in the housing and configured to illuminate the collected particles on the optically transparent substrate;

an image sensor disposed in the housing and located adjacent to the optically transparent substrate, wherein the image sensor collects diffraction patterns or holographic images cast upon the image sensor by the collected particles;

a computing device comprising one or more processors executing image processing software thereon and configured to receive the holographic images or diffraction patterns obtained from the portable, lens-free microscopy device, wherein the image processing software inputs the holographic images or diffraction patterns obtained at the one or more illumination wavelengths through a first trained deep neural network to output reconstructed amplitude and phase images of each aerosol particle and inputs the reconstructed amplitude and phase images of each aerosol particle in a second trained deep neural network and outputs one or more of the following for each aerosol particle: a classification or label of the type of aerosol particle, a classification or label of the species of the aerosol particle, a size of the aerosol particle, a shape of the aerosol particle, a thickness of the aerosol particle, and a spatial feature of the particle.

11. The system of claim 10, wherein the computing device is located remote from the portable, lens-free microscopy device.

12. The system of claim 10 wherein the computing device is locally connected with the portable, lens-free microscopy device via a wired or wireless communication link.

13. The system of claim 10, wherein the computing device comprises one or more processors integrated in the portable, lens-free microscopy device.

14. The system of claim 13, wherein the one or more processors integrated in the portable, lens-free microscopy device are configured to control the vacuum pump and the one or more illumination sources.

15. The system of claim 10, further comprising a mobile computing device having software or an application contained thereon for controlling the operation of the portable, lens-free microscopy device and displaying images of the aerosol particles and/or classification, size, shape, thickness, or spatial feature data.

* * * * *